(12) United States Patent
Schwarm et al.

(10) Patent No.: US 7,028,218 B2
(45) Date of Patent: Apr. 11, 2006

(54) REDUNDANT MULTI-PROCESSOR AND LOGICAL PROCESSOR CONFIGURATION FOR A FILE SERVER

(75) Inventors: Stephen C. Schwarm, Wrentham, MA (US); Earle T. Machardy, Jr., Durham, NC (US)

(73) Assignee: EMC Corporation, Hopkinton, MA (US)

( * ) Notice: Subject to any disclaimer, the term of this patent is extended or adjusted under 35 U.S.C. 154(b) by 554 days.

(21) Appl. No.: 10/308,161

(22) Filed: Dec. 2, 2002

(65) Prior Publication Data

US 2004/0153749 A1 Aug. 5, 2004

(51) Int. Cl.
*G06F 11/00* (2006.01)
(52) U.S. Cl. .............................. 714/11; 714/4; 714/12; 714/13; 711/162
(58) Field of Classification Search .................... 714/4, 714/11, 13, 12; 711/162
See application file for complete search history.

(56) References Cited

U.S. PATENT DOCUMENTS

| | | | |
|---|---|---|---|
| 4,445,174 A | 4/1984 | Fletcher ....................... 711/121 |
| 4,590,554 A * | 5/1986 | Glazer et al. .................. 714/13 |
| 4,691,280 A | 9/1987 | Bennett ....................... 710/305 |
| 5,051,887 A | 9/1991 | Berger et al. ................ 364/200 |
| 5,155,809 A | 10/1992 | Baker et al. ................. 395/200 |
| 5,206,939 A | 4/1993 | Yanai et al. ................. 395/400 |
| 5,255,270 A | 10/1993 | Yanai et al. ................. 371/10.2 |
| 5,488,716 A * | 1/1996 | Schneider et al. ............. 714/10 |
| 5,491,787 A | 2/1996 | Hashemi ................. 395/182.09 |
| 5,734,818 A * | 3/1998 | Kern et al. .................... 714/20 |
| 5,737,605 A | 4/1998 | Cunningham et al. ...... 719/312 |
| 5,742,792 A | 4/1998 | Yanai et al. ................. 395/489 |
| 5,758,052 A | 5/1998 | Glowny et al. ......... 395/182.02 |
| 5,764,882 A * | 6/1998 | Shingo ......................... 714/11 |
| 5,802,265 A * | 9/1998 | Bressoud et al. ............. 714/11 |
| 5,826,081 A | 10/1998 | Zolnowsky .................. 395/673 |
| 5,893,140 A | 4/1999 | Vahalia et al. ............... 711/118 |
| 5,901,281 A * | 5/1999 | Miyao et al. .................. 714/11 |
| 5,926,619 A | 7/1999 | Badovinatz et al. ... 395/182.02 |
| 5,938,765 A | 8/1999 | Dove et al. .................... 713/1 |
| 5,951,695 A | 9/1999 | Kolovson ..................... 714/16 |
| 5,978,565 A * | 11/1999 | Ohran et al. .................. 714/13 |

(Continued)

OTHER PUBLICATIONS

Helen S. Raizen and Stephen C. Schwarm, "Building a Semi-Loosely Coupled Multiprocessor System Based on Network Process Extension;" Pre-publication copy Jan. 29, 1991 (To be published by 1991 USENIX Symposium on Experiences with Distributed &Multiprocessor Systems), pp. 1-17.

(Continued)

*Primary Examiner*—Robert Beausoliel
*Assistant Examiner*—Philip Guyton
(74) *Attorney, Agent, or Firm*—Richard C. Auchterlonie; Novak Druce & Quigg, LLP.

(57) ABSTRACT

A redundant file server includes at least two dual processor boards. Each physical processor has two logical processors. The first logical processor of the first physical processor of each board executes storage system code under the Microsoft NT™ operating system. The second logical processor of the first physical processor of each board executes control station code under the Linux operating system. The first logical processor of the second physical processor of each board executes data mover code. The second logical processor of the second physical processor of each board is kept in a stand-by mode for assuming data mover functions upon failure of the first logical processor of the second physical processor on the first or second board.

34 Claims, 12 Drawing Sheets

U.S. PATENT DOCUMENTS

| | | | |
|---|---|---|---|
| 5,987,621 A | 11/1999 | Duso et al. | 714/4 |
| 6,003,123 A | 12/1999 | Carter et al. | 711/207 |
| 6,065,053 A | 5/2000 | Nouri et al. | 709/224 |
| 6,073,218 A * | 6/2000 | DeKoning et al. | 711/150 |
| 6,108,300 A | 8/2000 | Coile et al. | 370/217 |
| 6,112,286 A | 8/2000 | Schimmel et al. | 711/208 |
| 6,145,101 A | 11/2000 | Pike | 714/46 |
| 6,182,089 B1 | 1/2001 | Ganapathy et al. | 707/206 |
| 6,192,408 B1 | 2/2001 | Vahalia et al. | 709/229 |
| 6,199,179 B1 * | 3/2001 | Kauffman et al. | 714/26 |
| 6,223,204 B1 | 4/2001 | Tucker | 709/103 |
| 6,230,200 B1 | 5/2001 | Forecast et al. | 709/219 |
| 6,240,501 B1 | 5/2001 | Hagersten | 711/202 |
| 6,260,120 B1 | 7/2001 | Blumenau et al. | 711/152 |
| 6,269,390 B1 | 7/2001 | Boland | 709/100 |
| 6,275,953 B1 | 8/2001 | Vahalia et al. | 714/11 |
| 6,289,369 B1 | 9/2001 | Sundaresan | 709/103 |
| 6,292,905 B1 | 9/2001 | Wallach et al. | 714/4 |
| 6,314,501 B1 | 11/2001 | Gulick et al. | 711/153 |
| 6,314,515 B1 | 11/2001 | Miller et al. | 713/1 |
| 6,324,581 B1 | 11/2001 | Xu et al. | 709/229 |
| 6,327,670 B1 | 12/2001 | Hellenthal et al. | 714/5 |
| 6,363,464 B1 | 3/2002 | Mangione | 711/167 |
| 6,381,682 B1 | 4/2002 | Noel et al. | 711/153 |
| 6,430,667 B1 | 8/2002 | Loen | 711/202 |
| 6,594,735 B1 | 7/2003 | Baker et al. | 711/147 |
| 6,604,182 B1 | 8/2003 | Sexton et al. | 711/170 |
| 6,708,285 B1 * | 3/2004 | Oldfield et al. | 714/11 |
| 6,728,896 B1 * | 4/2004 | Forbes et al. | 714/4 |
| 6,813,522 B1 | 11/2004 | Schwarm et al. | 700/5 |
| 2002/0133751 A1 * | 9/2002 | Nair et al. | 714/38 |
| 2002/0152419 A1 * | 10/2002 | McLoughlin et al. | 714/11 |

OTHER PUBLICATIONS

Miruja et al., "Design and Evaluation of the High Performance Multi-Processor Server," Proceedings—IEEE International Conference on Computer Design: VLSI in Computers and Processors; Cambridge, Mass. Oct. 10-12, 1994, 1063-6404/94, 1994, IEEE, pp. 66-69.

"Building Cutting-Edge Server Applications; Intel® Xeon™ Processor Family Features the Intel NetBurst™ Microarchitecture with Hyper-Threading Technology;" 2002, Intel Corporation, pp. 1-9.

"Intel® Pentium® 4 and Intel® Xeon™ Processor Optimization" Reference Manual, 2002, Intel Corporation, U.S.A., pp. i to xxv, 1-1 to 1-27, 2-1 to 2-75, 7-1 to 7-33.

"EMC Celerra File Servers;", web page www.emc.com/products/networking/celerra.jsp (2 sheets), and EMC Celerra File Server—Reach new heights of availability and scalability with EMC Celerra File Server, brochure, 6 pages, EMC Corporation, Hopkinton, Mass.; 2002.

"Storage you can run your business on—at an affordable price; Clarion" web page, www.emc.com/products/systems/clarion.jsp (1 sheet), and "EMC Clariion Enterprise Storage Systems Product Description Guide", 39 pages, 2002.

"The Common Management Information Services and Protocols for the Internet (CMOT and CMIP);" Warrier, Besaw, LaBarre & Handspicker; RFC 1189, Oct. 1990, http:rfc.sunsite.dk/rfc/rfc1189.html, , pp. 1 to 15.(on 16 sheets).

"About InfiniBand® Trade Association: An InfiniBand™ Technology Overview;" 2002, InfiniBand Trade Association, www.infinibandta.org/ibta/, 5 pages.

"Intel® InfiniBand Architecture—Solutions for Developers and IT Managers;" 2002, Intel Corporation, 9 pages.

Odysseas Pentakalos, "An Introduction to the InfiniBand Architecture;" Feb. 4, 2002, O'Reilly Network, www.oreillynet.com/pub/a/network/2002/2/04/windows.html, 6 pages.

"VM Ware," Hallogram Publishing, 2002, VMware, Inc., www.hallogram.com/vmware/?source=goto, 4 pages.

Jeff Dike, "User Mode Linux—Running Linux on Linux," Linux Magazine 2001, www.linux-mag.com/cgi-bin/printer.pl?issue=2002-04&article=user_mode, 13 pages.

"Virtual Machines as Special Class of Operating Systems;" Vmware, www.softpanorama.cog/Freenix/vm.shtml, published at least as early as Jul. 24, 2002, 13 pages.

"Server Works Technology, Products;" 2002, ServerWorks, Inc., www.serverworks.com, technology/overview (2 pages), technology/history (2 pages), products/overview (1 page), products/matrix (3 pages), products/HE (3 pages), products/LE (3 pages), products/HESL (4 pages), products/GCHE (4 pages), products/GCLE (4 pages), products/GCSL (4 pages), products/GCWS (4 pages), news and events (5 pages), company (1 page).

"Intel® Chipsets" (2 pages), Intel® Chipsets Comparison Chart, (3 pages), 2002, Intel Corporation.

"Intel Motherboard Selector Guide—Your Source for Intel Architecture-Based Boards;" 2002, Intel Corporation (2 pages).

"Intel® Boxed Server and Workstation Products," 2002, Intel Corporation (2 pages).

"Boxed Intel® Xeon™ Processor for 1U Rack Mount Servers;" 2002, Intel Corporation (2 pages).

"Boxed Intel® Server Board SE7500WV,"(2 pages), "Boxed Intel® Server Board SE7500WV—Overview," (2 pages) and "Boxed Intel® Server Board SE7500WV—Technical," (1 page), 2002, Intel Corporation.

"Intel® Xeon™ Processor: Unparalleled Value and Flexibility for Small and Medium Business Server Applications;" 2002, Intel Corporation (4 pages).

"Intel® Server Board SE7500WV2: Superior Performance for Reliable and Manageable High-Density Solutions;" 2002, Intel Corporation (6 pages).

"Threading Tools" 2002, Intel Corporation (2 pages).

"Threading Services: Intel® Parallel Applications Center;" 2002, Intel Corporation (2 pages).

"A Solution for Counting Physical and Logical Processors in a 32-bit System;" 2002 Intel Corporation (3 pages).

"Adjusting Thread Stack Address to Improve Performance on Intel® Xeon™ Processors;" 2002, Intel Corporation (9 pages).

"Threading Tools," 2002, Intel Corporation (2 pages).

"KAP/Pro Toolset;" 2002, Intel Corporation (2 pages).

"Guide OpenMP Compiler;" 2002, Intel Corporation (7 pages).

"Assure Thread Analyzer;" 2002, Intel Corporation (4 pages).

"Parallel Computing Using Threads and OpenMP," 2002, Intel Corporation (2 pages).

* cited by examiner

CONTROL STATION MICROCODE FUNCTIONS

CONTROL STATION FAIL-OVER
DATA MOVER FAIL-OVER
NETWORK COMMUNICATION WITH AN OPERATOR
SERVER CONFIGURATION
SERVER LOADING STATISTICS
SERVER FAILURE REPORTING

DATA MOVER MICROCODE FUNCTIONS

NETWORK COMMUNICATION WITH CLIENTS
CLIENT AUTHENTICATION AND AUTHORIZATION
FILE SYSTEM ORGANIZATION
FILE SYSTEM ACCESS AND LOCKING
FILE SYSTEM LEVEL CACHE
    (IN A FILE SERVER OR FILE SERVER CLUSTER
     HAVING MORE THAN ONE PAIR OF DATA
     MOVER BOARDS)

FILE SYSTEM OWNERSHIP BY DATA MOVERS
    (IN A FILE SERVER OR FILE SERVER CLUSTER
     HAVING MORE THAN ONE PAIR OF STORAGE
     SYSTEM BOARDS OR DATA MOVER BOARDS)

STORAGE SYSTEM MICROCODE FUNCTIONS

ACCESS TO STORAGE SYSTEM CACHE
    MAINTAINING A RESPECTIVE COPY OF
    CACHE DATA IN EACH STORAGE SYSTEM
    PROCESSOR BOARD

LOGICAL-TO-PHYSICAL MAPPING (RAID 0 TO 5)
    STAGING FROM DISK TO CACHE
    WRITE-BACK FROM CACHE TO DISK

FIG. 6

REDUNDANT MULTI-PROCESSOR AND LOGICAL PROCESSOR CONFIGURATION FOR A FILE SERVER

BACKGROUND OF THE INVENTION

1. Field of the Invention

The present invention relates generally to the use of multiple processors in a file server, and in particular to such a file server using physical processors having more than one set of central processor registers sharing an on-chip cache and multiple functional units. Each set of central processor registers functions as a respective logical processor.

2. Background Art

With the advent of cache memory, there has been an advantage to coupling multiple processors to a shared memory for general-purpose applications. By providing a dedicated cache memory for each processor, each processor can operate at nearly 100% of the time by accessing cache memory most of the time and accessing the shared memory during a small percentage of the time. The shared memory can also be used for communication between the processors. Since the introduction of the Intel PENTIUM (Trademark) microprocessor, the caches and memory management circuitry have been integrated onto commodity processor chips together with special machine instructions to facilitate the construction of multiprocessor systems.

One application for a multiprocessor system is a network server. A conventional operating system for a network server is the Unix system. The problem of converting the Unix system for execution on a multiprocessor architecture is discussed in H. S. Raizen and S. C. Schwarm, "Building a Semi-Loosely Coupled Multiprocessor System Based on Network Process Extension," 1991 USENIX Symposium on Experiences with Distributed and Multiprocessor Systems.

More recently, it has become practical to put more than one central processing unit register set on a single chip. The Intel® PENTIUM IV XEON (Trademark) processor, for example, has two central processor register sets that share an on-chip cache and multiple functional units. Each register set functions as a separate logical processor. The processing of a multi-threaded application by the two logical processors on the same physical processor is called "Hyper-Treading technology." See, for example, "Building Cutting-Edge Server Applications, Intel® Xeon™ Processor Family Features the Intel NetBurst™ Microarchitecture with Hyper-Threading Technology," Intel Corporation, 2002, and Chapter 7, "Multiprocessor and Hyper-Treading Technology," in the Intel® Pentium™ 4 and Intel® Xeon™ Processor Optimization Reference Manual, Order No. 248966-05, Intel Corporation, 2002.

For use in servers, it is practical to put at least two of the Intel® Pentium™ IV Xeon™ processors on a single circuit board. For example, Intel Corporation offers a server board No. SE7500WV2 having sockets for two Xeon™ processors, sockets for up to 12 gigabytes of random access memory (RAM), dual (two-way) interleaved memory, triple-peer PCI/PCI-X buses and slots for the buses, two integrated server network connections, an optional dual-channel Redundant Array of Inexpensive Disk (RAID) controller, a video controller with eight megabytes of video memory, and server management software and hardware including serial data/console redirection over Local Area Network (LAN), integrated remote management, event alerting, and proactive fault management. A variety of server boards, including two or four Xeon™ processors, are offered by ServerWorks, 2451 Mission College Blvd., Santa Clara, Calif. 95404.

Although multi-processor server boards are now readily available, there is a need for server software that can effectively use the Hyper-Threading technology. The time and cost of development of the server software has been a factor delaying the introduction of the Hyper-Threading technology into the server market and preventing the attainment of all of the benefits of the Hyper-Threading technology. To address this problem, Intel Corporation distributes on its web site free documentation regarding how to divide an application into multiple threads (such as the above-cited Intel® Xeon™ Processor Optimization Reference Manual), and also offers a number of threading tools (such as the Intel® KAP/Pro Toolset for OpenMP) for adding parallelism to existing software.

SUMMARY OF THE INVENTION

The present invention deals with the problem of adapting pre-existing server software to Hyper-Threading technology. Instead of simply decomposing the software into primitive functions, composing threads for the functions, and assigning the threads to respective physical and logical processors, it was discovered that certain existing software modules can be assigned to respective physical and logical processors while obtaining many if not most of the benefits of the Hyper-Threading Technology. In addition, the software modules can be adapted to provide a high degree of data availability in the event of hardware failure.

In accordance with a first aspect, the invention provides a redundant file server including at least a first processor board and a second processor board. Each of the first and second processor boards is programmed to perform file server functions. Moreover, the first processor board is programmed to assume the file server functions of the second processor board upon failure of the second processor board, and the second processor board is programmed to assume the file server functions of the first processor board upon failure of the first processor board. Each of the first and second processor boards includes at least a first physical processor and a second physical processor. At least the first physical processor on each of the first and second processor boards has an on-chip cache, multiple functional units, and more than one processor register set sharing the on-chip cache and the multiple functional units to provide a first logical processor and a second logical processor. The first logical processor of the first physical processor of each of the first and second processor boards is programmed to perform storage functions including logical-to-physical mapping and access to multiple storage devices. The second logical processor of the first physical processor of each of the first and second processor boards is programmed to execute file server control functions. The second physical processor of each of the first and second processor boards is programmed to execute data mover functions including network communication with clients and file system access. The first logical processor of the first physical processor of the first processor board is programmed to assume the storage system functions of the first logical processor of the first physical processor of the second processor board upon failure of the first logical processor of the first physical processor of the second processor board. The first logical processor of the first physical processor of the second processor board is programmed to assume the storage system functions of the first logical processor of the first physical processor of the first processor board upon failure of the first logical processor of the first physical processor of the first processor board. The second logical processor of the first physical processor of the first processor board is programmed to assume the file server control functions of the second logical processor of the first physical processor of the second processor board upon failure of the second logical processor of the first physical processor of the second processor board. The second logical processor of the first physical processor of the second processor board is programmed to assume the file server control functions of the second logical processor of the first physical processor of the first processor board upon failure of the second logical processor of the first physical processor of the first processor board. The second physical processor of the first processor board is programmed to assume the data mover functions of the second physical processor of the second processor board upon failure of the second physical processor of the second processor board. Moreover, the second physical processor of the second processor board is programmed to assume the data mover functions of the second physical processor of the first processor board upon failure of the second physical processor of the first processor board.

In accordance with another aspect, the invention provides a redundant file server including at least a first processor board and a second processor board. Each of the first processor board and the second processor board is programmed to perform file server functions. The first processor board is programmed to assume the file server functions of the second processor board upon failure of the second processor board. The second processor board is programmed to assume the file server functions of the first processor board upon failure of the first processor board. Each of the processor boards includes a physical processor. Each of the physical processors has an on-chip cache, multiple functional units, and more than one processor register set sharing the on-chip cache and the multiple functional units to provide a first logical processor and a second logical processor. The first logical processor of the physical processor of each of the first and second processor boards is programmed to execute file server code under a first operating system. The second logical processor of the physical processor of each of the first and second processor boards is programmed to execute file server code under a second operating system, and the second operating system is different from the first operating system.

In accordance with yet another aspect, the invention provides a redundant file server including at least a first processor board and a second processor board. Each of the first and second processor boards is programmed to perform file server functions. Moreover, the first processor board is programmed to assume the file server functions of the second processor board upon failure of the second processor board, and the second processor board is programmed to assume the file server functions of the first processor board upon failure of the first processor board. Each of the first and second processor boards includes at least a first physical processor and a second physical processor. Each of the first and second physical processors has an on-chip cache, multiple functional units, and more than one processor register set sharing the on-chip cache and the multiple functional units to provide a first logical processor and a second logical processor. The first logical processor of the first physical processor of each of the first and second processor boards is programmed to perform storage functions including logical-to-physical mapping and access to multiple storage devices. The second logical processor of the first physical processor of each of the first and second processor boards is programmed to execute file server control functions. The first logical processor of the second physical processor of each of the first and second processor boards is programmed to execute data mover functions including network communication with clients and file system access. The second logical processor of the second physical processor of each of the first and second processor boards is programmed to be in a stand-by state for execution of data mover functions. The first logical processor of the first physical processor of the first processor board is programmed to assume the storage system functions of the first logical processor of the first physical processor of the second processor board upon failure of the first logical processor of the first physical processor of the second processor board. The first logical processor of the first physical processor of the second processor board is programmed to assume the storage system functions of the first logical processor of the first physical processor of the first processor board upon failure of the first logical processor of the first physical processor of the first processor board. The second logical processor of the first physical processor of the first processor board is programmed to assume the file server control functions of the second logical processor of the first physical processor of the second processor board upon failure of the second logical processor of the first physical processor of the second processor board. The second logical processor of the first physical processor of the second processor board is programmed to assume the file server control functions of the second logical processor of the first physical processor of the first processor board upon failure of the second logical processor of the first physical processor of the first processor board. The second logical processor of the second physical processor of the first processor board is programmed to assume the data mover functions of the first logical processor of the second physical processor of the second processor board upon failure of the second physical processor of the second processor board. Moreover, the second logical processor of the second physical processor of the second processor board is programmed to assume the data mover functions of the first logical processor of the second physical processor of the first processor board upon failure of the second physical processor of the first processor board.

In accordance with a final aspect, the invention provides a redundant file server. The file server includes a first processor board, a second processor board, and multiple storage devices. Each of the first and second processor boards includes at least a first physical processor, a second physical processor, random access memory shared between the first physical processor and the second physical processor, a first network port for responding to file access requests from clients in a data network, a second port, and a third port. The second port of the first processor board is linked to the second port of the second processor board for transfer of data between the first processor board and the second processor board. Each of the physical processors has an on-chip cache, multiple functional units, and more than one processor register set sharing the on-chip cache and the multiple functional units to provide a first logical processor and a second logical processor. Each of the multiple storage devices has at least one port linked to the third port of the first processor board for data transmission from the storage device to the third port of the first processor board, and another port linked to the third port of the second processor board for data transmission from the storage device to the third port of the second processor board. The first logical processor of the first physical processor of each of the first and second processor boards is programmed to execute storage system code. The second logical processor of the first physical processor of each of the first and second processor boards is programmed to execute file server control station code. The first logical processor of the second physical processor of each of the first and second processor boards is programmed to execute data mover code. The second logical processor of the second physical processor of each of the first and second processor boards is programmed to be in a stand-by state for execution of data mover code. The first logical processor of the first physical processor of the first processor board is programmed to assume storage system functions of the first logical processor of the first physical processor of the second processor board upon failure of the first logical processor of the first physical processor of the second processor board. The first logical processor of the first physical processor of the second processor board is programmed to assume storage system functions of the first logical processor of the first physical processor of the first processor board upon failure of the first logical processor of the first physical processor of the first processor board. The second logical processor of the first physical processor of the first processor board is programmed to assume file server control station functions of the second logical processor of the first physical processor of the second processor board upon failure of the second logical processor of the first physical processor of the second processor board. The second logical processor of the first physical processor of the second processor board is programmed to assume file server control station functions of the second logical processor of the first physical processor of the first processor board upon failure of the second logical processor of the first physical processor of the first processor board. The second logical processor of the second physical processor of the first processor board is programmed to assume data mover functions of the first logical processor of the second physical processor of the second processor board upon failure of the second physical processor of the second processor board. The second logical processor of the second physical processor of the second processor board is programmed to assume data mover functions of the first logical processor of the second physical processor of the first processor board upon failure of the second physical processor of the first processor board.

BRIEF DESCRIPTION OF THE DRAWINGS

Other objects and advantages of the invention will become apparent upon reading the following detailed description with reference to the drawings, in which:

FIG. 6 is a table summarizing various control station microcode functions, data mover microcode functions, and storage system microcode functions;

Figure 1:
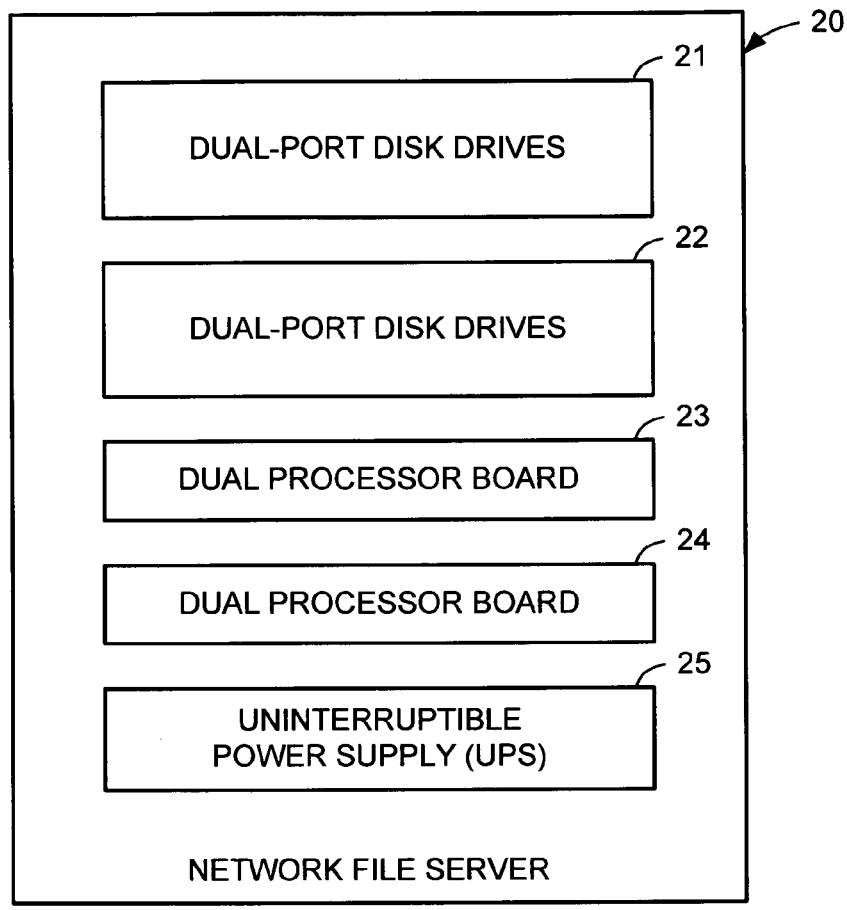
FIG. 1 is a front view of a physical arrangement of components in a network file server in accordance with the present invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

FIG. 1 shows a front view of a physical layout of a network file server 20. The network file server 20 includes a stack of physical components. From top to bottom, the physical components include a first row of dual-port disk drives 21, a second row of dual-port disk drives 22, a first dual-processor circuit board 23, a second dual processor circuit board 24, and an uninterruptible power supply 25.

The physical arrangement shown in FIG. 1 corresponds to a server configured with a minimal number of components, and the present invention can be practiced using more complex configurations. For example, the capabilities of the network file server 20 may be expanded by providing additional rows of disk drives and additional dual processor boards. On one hand, a customer may need additional storage without additional processing power, and in this case, additional disk drives are added. On the other hand, a customer may need additional network connectivity or may need to service a relatively large number of client requests, and in this case, additional dual processor boards are added. If a customer needs additional storage and additional network connectivity or processing power, then a number of network file servers 20 as shown in FIG. 1 can be linked together.

Figure 2:
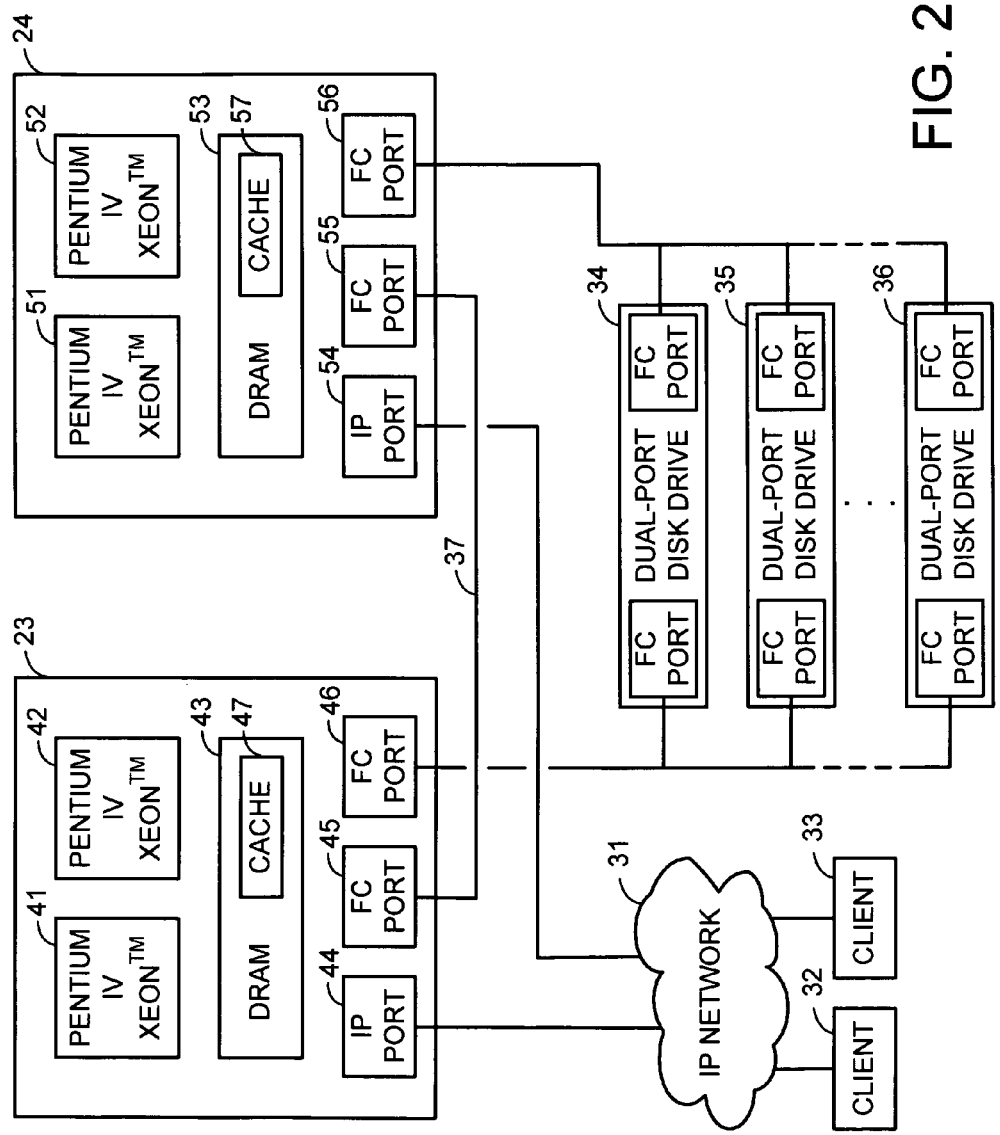
FIG. 2 is a schematic diagram of components in the network file server of FIG. 1.

FIG. 2 shows the data handling components in the network file server of FIG. 1 and their connection via an Internet Protocol (IP) network 31 to network clients 32, 33. There are dual redundant data paths from the IP network 31 to each of a number of the dual-port disk drives 34, 35, . . . , 36. Therefore, any one of the dual processor boards 23, 24 may fail without denying access of the clients 32, 33 to data in the dual-port disk drives. Up to one hundred dual-port disk drives 34, 35, . . . , 36 can be linked to the two dual processor boards 23, 34 in the fashion shown in FIG. 2. Moreover, there is a data link 37 between the dual processor boards 23, 24 for passing data and control information between the dual processor boards in order to maintain a state of readiness for recovery from any failure of one of the dual processor boards. For example, the data and control information is passed over the link 37 using the Common Management Information Services and Protocols for the Internet (CMOT and CMIP) of RFC 1189 published by the Network Working Group associated with the International Organization for Standardization (ISO).

Preferably, the dual processor boards 23, 24 have an identical physical construction. For example, the first dual processor board 23 has a first Pentium™ IV Xeon™ processor 41 and a second Pentium™ IV Xeon™ processor 42. The first dual processor board 23 also has dynamic random access memory (DRAM) 43 that is shared between the processors 41, 42. In addition, the first dual processor board 23 has an IP port 44 linked to the IP network 31, a first Fiber-channel port 45 for the data link 37 between the dual-processor circuit boards 23, 24, and a second fiber-channel port 46 connected to each of the dual-port disk drives 34, 35, ..., 36. In a similar fashion, the second dual processor board 24 includes a first Pentium™ IV Xeon™ processor 51, a second Pentium™ IV Xeon™ processor 52, DRAM 53, a first IP port 54 connected to the IP network 31, a second Fiber-channel port 55 connected to the data link 37, and a second Fiber-channel port 56 connected to each of the dual-port disk drives 34, 35, ..., 36. The link 37 between the dual processor boards 23, 24 is used to maintain a storage cache 47 in the DRAM 43 of the first dual processor board 23 that is a mirror of the storage cache 57 in the DRAM 53 of the second dual processor board 24.

In a preferred implementation, the dual processor boards 23, 24 use the server board chip set of ServerWorks, 2451 Mission College Blvd., Santa Clara, Calif. 95404. The dual-processor boards are similar to the ServerWorks dual processor server boards offered for general commercial use except that they have been customized for the functions of the network file server 20 by stripping the boards of unnecessary components and providing the ports 44–46 and 54–56 shown in FIG. 2.

Figure 3:
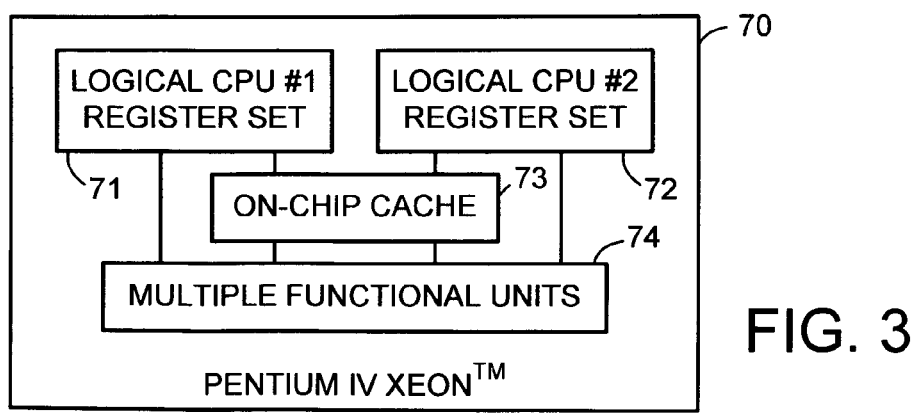
FIG. 3 is a block diagram of a Pentium™ IV Xeon™ processor having two logical central processor unit (CPU) register sets.

FIG. 3 shows a block diagram of the Pentium™ IV Xeon™ processor. The Pentium™ IV Xeon™ processor includes a first logical CPU register set 71 and a second logical CPU register set 72. Each of the logical CPU register sets 71, 72 share an on-chip cache 73 and share multiple functional units 74.

Figure 4:
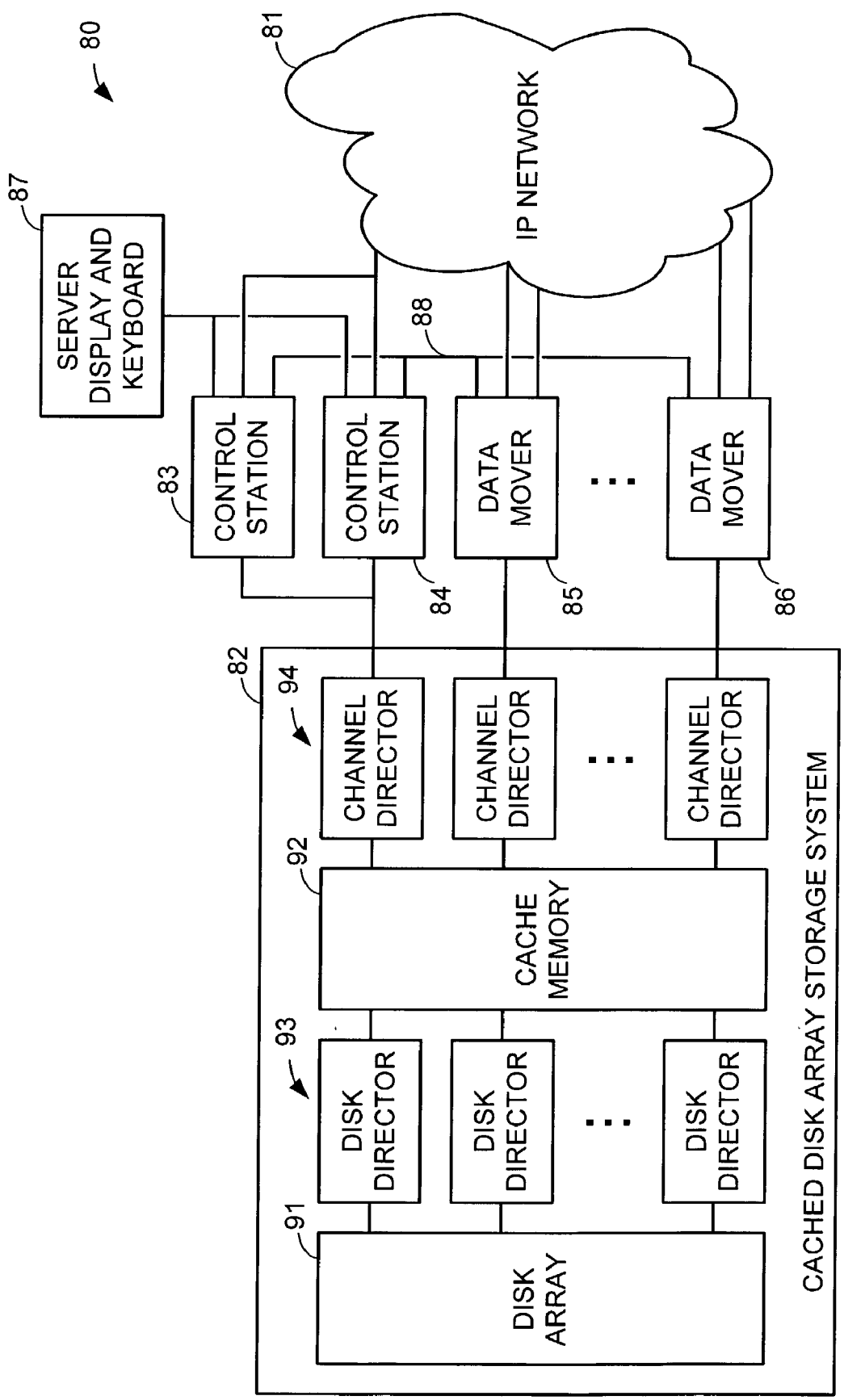
FIG. 4 is a block diagram of a network file server comprised of a cached disk array storage system and multiple data mover computers for moving data between the cached disk array and a data network.

The present invention deals with the problem of configuring and programming dual processor boards including the Pentium™ IV Xeon™ processors in order to perform the functions previously performed in a network file server 80 having the physical construction shown in FIG. 4. In particular, FIG. 4 shows the physical construction of a CELERRA (Trademark) brand of file server manufactured and sold by EMC Corporation, 171 South Street, Hopkinton, Mass., 01748-9103.

The network file server 80 provides basic file access operations such as opening a file, reading a file, writing to a file, and closing a file. The network file server 80 also provides enterprise-wide connections with concurrent multi-protocol support for industry standard protocols such as the Network File System (NFS) and the Common Internet File System (CIFS).

Programming for the network file server 80 is described in the following patents, all of which are incorporated by reference herein: Yanai et al., U.S. Pat. No. 5,206,939 entitled "System and Method for Disk Mapping and Data Retrieval"; Yanai et al., U.S. Pat. No. 5,255,270 entitled "Method of Assuring Data Write Integrity on a Data Storage Device"; Yanai et al., U.S. Pat. No. 5,742,792 entitled "Remote Data Mirroring"; Vahalia et al., U.S. Pat. No. 5,893,140 entitled "File Server Having a File System Cache and Protocol for Truly Safe Asynchronous Writes"; Duso et al., U.S. Pat. No. 5,987,621 entitled "Hardware and Software Failover Services for a File Server"; Vahalia et al., U.S. Pat. No. 6,192,408 entitled "Network File Server Sharing Local Caches of File Access Information in Data Processors Assigned to Respective File Systems"; Vahalia et al., U.S. Pat. No. 6,275,953 entitled "Recovery from Failure of a Data Processor in a Network Server"; Xu et al., U.S. Pat. No. 6,324,581 entitled "File Server System Using File System Storage, Data Movers, and an Exchange of Meta Data Among Data Movers for File Locking and Direct Access to Shared File Systems"; and Blumenau et al., U.S. Pat. No. 6,260,120 entitled "Storage Mapping and Partitioning among Multiple Host Processors in the Presence of Login State Changes and Host Controller Replacement."

In FIG. 4, each box represents a separate physical enclosure, processor, or group of circuit boards dedicated to a particular function. The network file server 80 includes a cached disk array storage system 82, dual-redundant control station computers 83, 84, and a plurality of data mover computers 85, 86 for moving data between the cached disk array storage system 82 and an IP network 81. Each of the control stations 83, 84 is linked to a server display and keyboard 87 providing an operator interface. A dual-redundant internal Ethernet link 88 interconnects the control stations 83, 84 and the data movers 85, 86 for coordination between the control stations and the data movers.

Each of the control station computers 83, 84 and each of the data mover computers 85, 86 is a high-end commodity computer, providing the highest performance appropriate for a data mover at the lowest cost. The clustering of the data movers 85, 86 as a front end to the cached disk array 82 provides parallelism and scalability. The clustering of random-access memory in the data movers 85, 86 also supplements cache resources 92 of the cached disk array storage system 82.

The number of the data movers 85–86, their processor class (Pentium™, etc.) and the amount of random-access memory in each of the data movers, are selected for desired performance and capacity characteristics, such as the number of concurrent network clients to be serviced. Preferably, one or more of the data movers are kept in a standby mode, to be used as "hot spares" or replacements for any one of the other data movers that fails to acknowledge commands from the other data movers or is otherwise found to experience a failure.

Each of the data movers 85–86 contains one or more high-performance FWD (fast, wide, differential) SCSI (Small Computer System Interface) connections to the cached disk array 82. Each of the data movers 85–86 also contains one or more bi-directional network attachments configured on the data mover's EISA or PCI bus for attachment to the IP network 81.

The control stations 83, 84 run a conventional operating system (such as Windows NT or UNIX) to provide a hot-failover redundant configuration for servicing of the server display and keyboard 87. An operator (not shown) at the display and keyboard 87 uses the Simple Network Management Protocol (SNMP) for management and control of the resources of the network file server 80.

The cached disk array storage system 82 is configured for an open systems network environment. For example, the cached disk array 82 is a Symmetrix 5500 (Trademark)

brand cached disk array manufactured by EMC Corporation, 171 South Street, Hopkinton, Mass., 01748-9103.

The cached disk array storage system 82 includes an array of disk drives 91, a large capacity semiconductor cache memory 92, disk directors 93, and channel directors 94. The disk directors 93 "stage" requested data from the disk array 91 to the cache memory 92, and write new data from the cache memory 92 to the disk array 91 in a background process. The channel directors 94 link the control stations 83, 84 and the data movers 85, 86 to the cache memory 92. In addition to providing intermediate storage for the data transferred between the channel directors 94 and the disk directors 93, the cache memory 92 also provides intermediate storage for control information transferred among the channel directors 94 and disk directors 93.

What is desired is a way of adapting the program modules of the network file server 80 of FIG. 4 for use in the network file server 20 of FIG. 1. In addition, it is desired for the network file server 20 of FIG. 1 to provide a similar level of data availability and minimal disruption of data processing operations in the event of failure in the network file server 20 of FIG. 1. As described below, this can be done by judicious allocation of the program modules to the logical CPUs in the network file server 20 of FIG. 1, and appropriate fail-over procedures.

Figure 5:
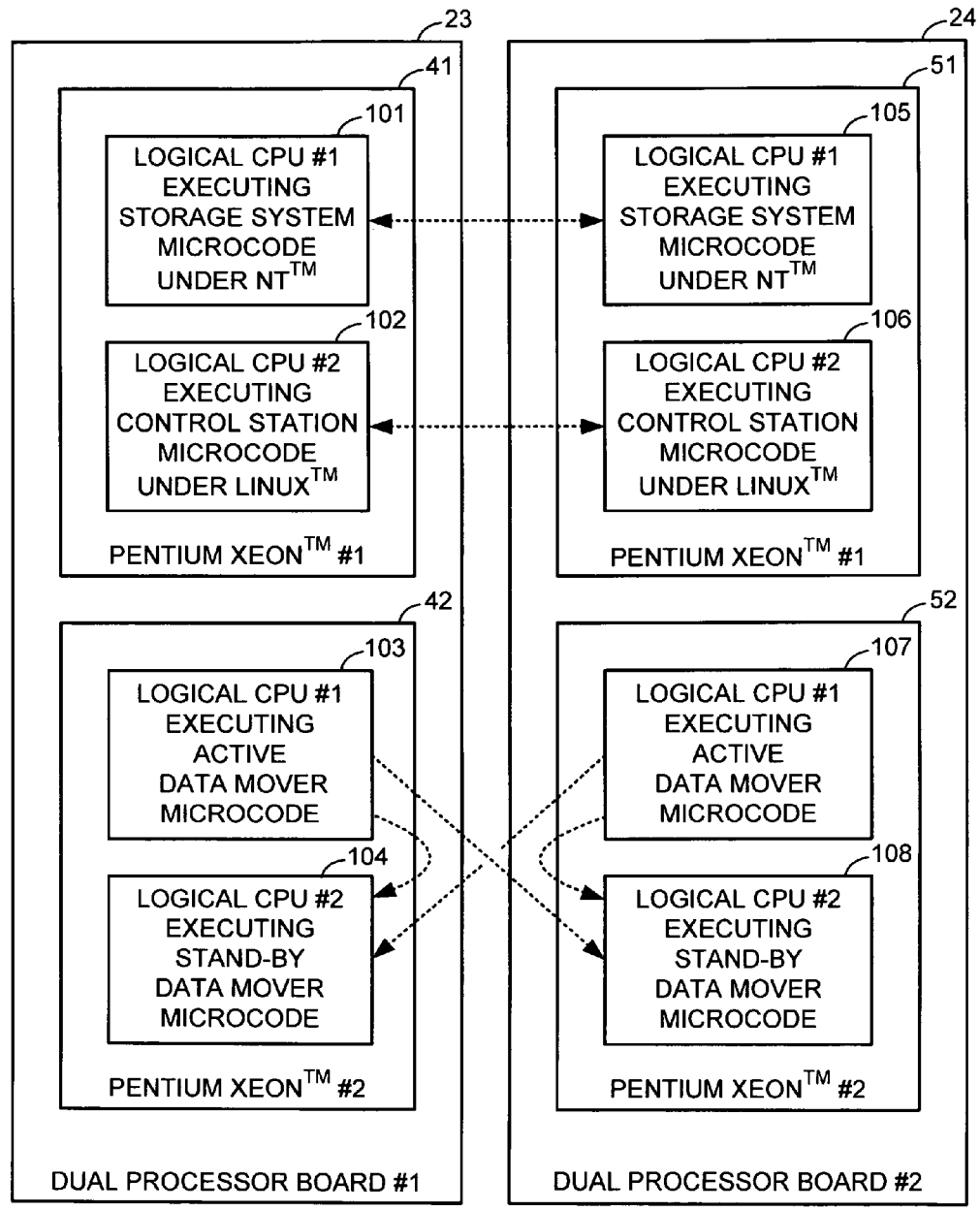
FIG. 5 is a block diagram showing respective functions of the logical CPUs in the physical processors and dual processor boards of the network file server of FIG. 1.

FIG. 5 shows that each of the logical CPUs in the dual processor boards 23, 24 of the network file server of FIG. 1 are dedicated to executing microcode of particular software modules adapted from the network file server 80 of FIG. 4. FIG. 5 also indicates how the functions originally performed by each logical CPU are assumed by another logical CPU when a logical CPU fails. Such a failure may occur due to a failure in the register set of the logical CPU, some other failure in the Pentium™ IV Xeon™ processor containing this logical CPU, or some other failure of the dual processor board including this Pentium™ IV Xeon™ processor.

As shown in FIG. 5, the first logical CPU 101 of the first Pentium™ IV Xeon™ processor 41 on the first dual processor board 23 executes storage system microcode under supervision of a Microsoft NT (trademark) operating system. The storage system microcode performs the storage system cache management functions, the channel director functions, and the disk director functions. The storage system microcode performs logical-to-physical mapping and supports RAID levels 0 to 5. The second logical CPU 102 of the first Pentium™ IV Xeon™ processor 41 of the first dual processor board 23 executes control station microcode under control of the Linux operating system. During operation of the first Pentium™ IV Xeon™ processor 41, each of the Microsoft NT™ or the Linux operating systems can be halted, resumed, or re-booted independent of the other. The first logical CPU 103 of the second Pentium™ IV Xeon™ processor 42 executes data mover microcode for what is normally an active data mover function. The second logical CPU 104 of the second Pentium™ IV Xeon™ 42 also executes data mover microcode normally in a "stand-by" mode.

Preferably, the second dual processor board 24 is programmed in a fashion identical to the first dual processor board 23. Therefore, the first logical CPU 105 of the first Pentium™ IV Xeon™ processor 51 of the second dual processor board 24 executes storage system microcode under the Microsoft NT (trademark) operating system, and the second logical CPU 106 of the first Pentium™ IV Xeon™ processor 51 of the second dual processor board 24 executes control station microcode under the Linux operating system. The first logical CPU 107 of the second Pentium™ IV Xeon™ processor 52 of the second dual processor board 24 executes data mover microcode normally in an "active" mode, and the second logical CPU 108 of the second Pentium™ IV Xeon™ processor 52 of the second dual processor board 24 executes data mover microcode normally in a "stand-by" mode.

For fail-over purposes, the two logical CPUs 101, 105 executing storage system microcode are paired in a cooperative fashion to normally share storage system functions, and each logical CPU executing storage system microcode also functions to maintain itself in a state of readiness to quickly assume and resume transactions of the other logical CPU when there is a failure of the other logical CPU to execute a storage system transaction.

The two logical CPUs 102, 106 executing the control station microcode are paired in a master-slave relationship for configuration and control of the network file server. In other words, at any one time, so long as at least one of the logical CPUs is capable of executing the control station microcode, one of these logical CPUs 102, 106 assumes mater status to actively control the network file server, and the other of these logical CPUs 102, 106, if it is operational, operates in a "stand-by" mode in which it merely monitors the performance of the master logical CPU in order that the logical CPU in "stand-by" mode may assume master status and resume control operations upon a failure of the master logical CPU.

The logical CPUs 103, 104, 107, 108 executing data mover microcode are arranged in a "2+2" fail-over mode in which the logical CPU executing the data mover microcode in the "stand-by" mode is prepared to assume and resume data mover functions being performed by the logical CPU in the other data processor board executing the data mover microcode in the "active" mode in case this logical CPU executing data mover microcode in the "active" mode has a failure disrupting its execution of the data mover microcode.

FIG. 6 summarizes various control station microcode functions, data mover microcode functions, and storage system microcode functions. The control station microcode functions include control station fail-over, data mover fail-over, and network communication with an operator for server configuration, collection and reporting of server loading statistics, and collection and reporting of server failure information. Control station fail-over is described further below with reference to FIGS. 9 to 12. Data mover fail-over is described further below with reference to FIGS. 12 and 13.

The data mover microcode functions include network communication with clients, client authentication and authorization, file system organization, and file system access and locking. In a file server or in a cluster of file servers having more than one pair of data mover boards (e.g., in the server of FIG. 7), the data mover microcode may also provide a file system level cache function. In such a storage system, the pair of data mover boards does not contain the storage cache of at least some of the file data in the system, so a file system cache local to the pair of data mover boards may improve performance and reduce loading on the storage cache. In a file server or a cluster of file servers having more than one pair of storage system boards or data mover boards, the data mover microcode may also provide file system ownership by data movers. In other words, a respective data mover may be assigned exclusively the task of managing locks upon each file system in order to manage contention for the locks and to simplify recovery in the event of a failure. For example, the locks on a file system stored in disk drives strung to a pair of dual processor boards are managed by a logical CPU executing data mover microcode on one of the dual processor boards in the pair of dual processor boards.

The storage system microcode provides access to the storage system cache. The storage system microcode also maintains a respective copy of cache data in each storage system processor board of each pair of storage system processor boards. The storage system microcode performs logical-to-physical mapping for RAID levels 0 to 5. This is done for staging from disk storage to cache when a data mover logical CPU or a control station logical CPU requests a specified logical block of data and the logical block of data is not found in the storage system cache. The logical-to-physical mapping is also done when a data mover logical CPU or a control station logical CPU writes new data to the storage system cache, and in a background task the new data is written from the storage cache to disk storage.

Figure 7:
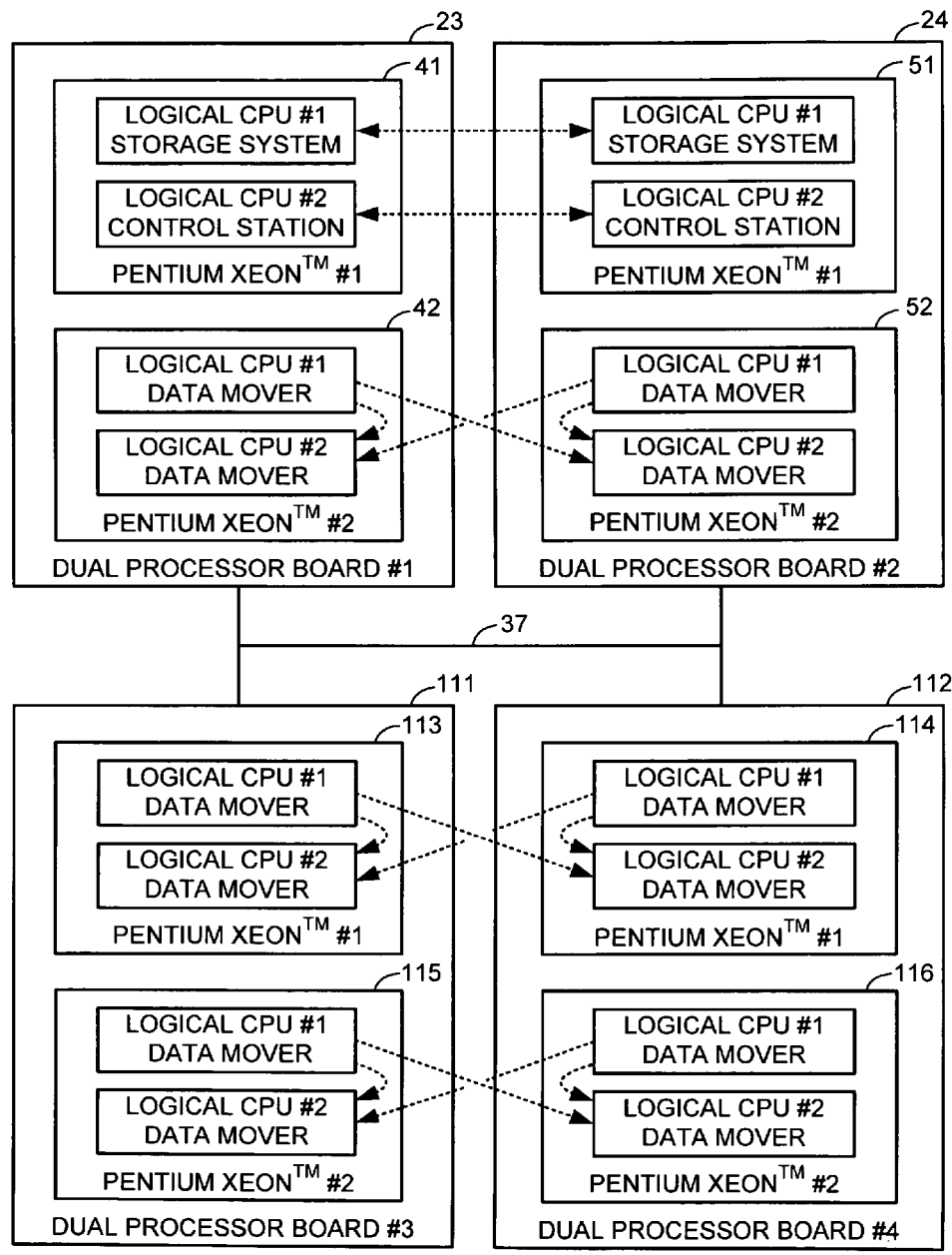
FIG. 7 is a block diagram showing respective functions of logical CPUs in the network file server of FIG. 1 after two additional dual processor boards are added in order to provide additional data movers for enhanced network connectivity for serving an increased number of clients.

As shown in FIG. 7, a third dual processor board 111 and a fourth dual processor board 112 can be linked to the first and second dual processor boards 23, 24 by the data link 37. In this fashion, additional network ports or additional disk drive ports can be added to the network file server to service additional network clients or to provide additional disk storage. In addition, the Fibre-channel link 37 of FIG. 2 can be used to interconnect two or more network file servers 20 as shown in FIG. 1 (or network file servers as shown in FIG. 7) for supporting additional network clients and providing additional disk storage. Moreover, InfiniBand technology (an open standard for sharing input/output interconnects among servers) can be used for interconnecting multiple network file servers 20 to provide a server cluster.

In this case of FIG. 7, the third and fourth dual processor boards have been programmed to support additional clients, since each of the logical CPU of the Pentium™ IV Xeon™ processors 113, 114, 115, and 116 on the additional third and fourth dual processor boards 111, 112 are configured to function as data movers. In addition, a first Pentium™ IV Xeon™ processor 113 in the third dual processor board 111 is paired with a first Pentium™ IV Xeon™ processor 114 in the fourth dual processor board, and a second Pentium™ IV Xeon™ processor 115 in the third dual processor board 111 is paired with a second Pentium™ IV Xeon™ processor 116 in the fourth dual processor board 112.

Figure 8:
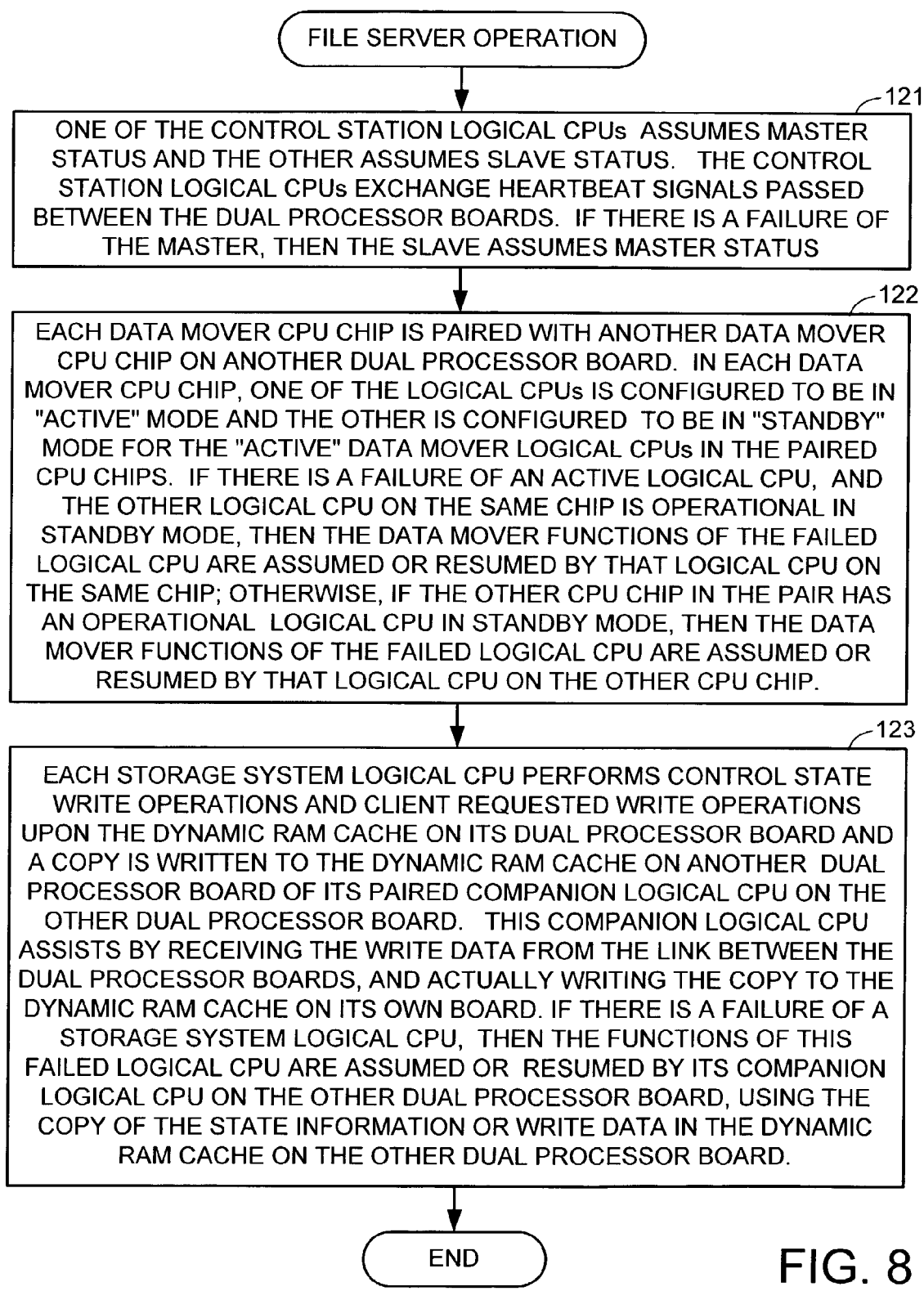
FIG. 8 is a flowchart of operation of the network file server of FIG. 1.

FIG. 8 shows the general operating procedure for the network file server 20 of FIG. 1. In a first step 121 of FIG. 7, one of the control station logical CPUs (102 or 106 in FIG. 5) assumes master status and the other control station logical CPU assumes slave status. The master and slave control station logical CPUs exchange heartbeat signals that pass between the dual processor boards (over the link 37 in FIG. 2). If there is a failure of the master, then the slave assumes master status.

In the next step 122, each data mover CPU chip is paired with another data mover CPU chip in another dual processor board. In each data mover CPU chip, one of the logical CPUs is configured to be in "active" mode and the other is configured to be in "stand-by" mode for the "active" data mover logical CPUs in the paired CPU chips. If there is a failure of a data mover active logical CPU, and the other data mover logical CPU on the same chip is operational in stand-by mode, then the data mover functions of the failed logical CPU are assumed or resumed by that logical CPU on the same chip; otherwise, if the other CPU chip in the pair has an operational logical CPU in stand-by mode, then the data mover functions of the failed logical CPU are assumed or resumed by that logical CPU on the other CPU chip.

In a final step 123, each storage system logical CPU performs control state write operations and client requested write operations upon the dynamic RAM cache on its dual processor board and a copy is written to the dynamic RAM cache on another dual processor board of its paired companion logical CPU on the other dual processor board. This companion logical CPU assists by receiving the write data from the link between the dual processor boards and actually writing the copy to the dynamic RAM cache on its own board. If there is a failure of a storage system logical CPU, then the functions of this failed logical CPU are assumed or resumed by its companion logical CPU on the other dual processor board, using the copy of the state information or write data in the dynamic RAM cache on the other dual processor board.

FIGS. 9 to 13 show details of the fail-over software for the Network File Server 80 of FIG. 4. From theses figures and the following description, it should become apparent that this software can adapted to perform corresponding fail-over functions depicted in FIGS. 5 to 8 by replacing the data mover and control station identifications or slot numbers for the network file server 80 of FIG. 4 with identifications of the corresponding logical CPUs in FIG. 5. Moreover, the "master" control station logical CPUs can control fail-over of the storage system logical CPUs in a fashion similar to the fail-over of the data mover logical CPUs. In other words, the "master" control station logical CPU monitors heartbeat signals from the storage system logical CPUs. Upon detection of a heartbeat signal from a storage system logical CPU reporting a failure, or upon a failure to detect a heartbeat signal from a storage system logical CPU within a predefined timeout period, the "master" control station shuts down the failed logical CPU, and commands its companion storage system logical CPU to assume or resume the storage system functions of the failed logical CPU.

Figure 9:
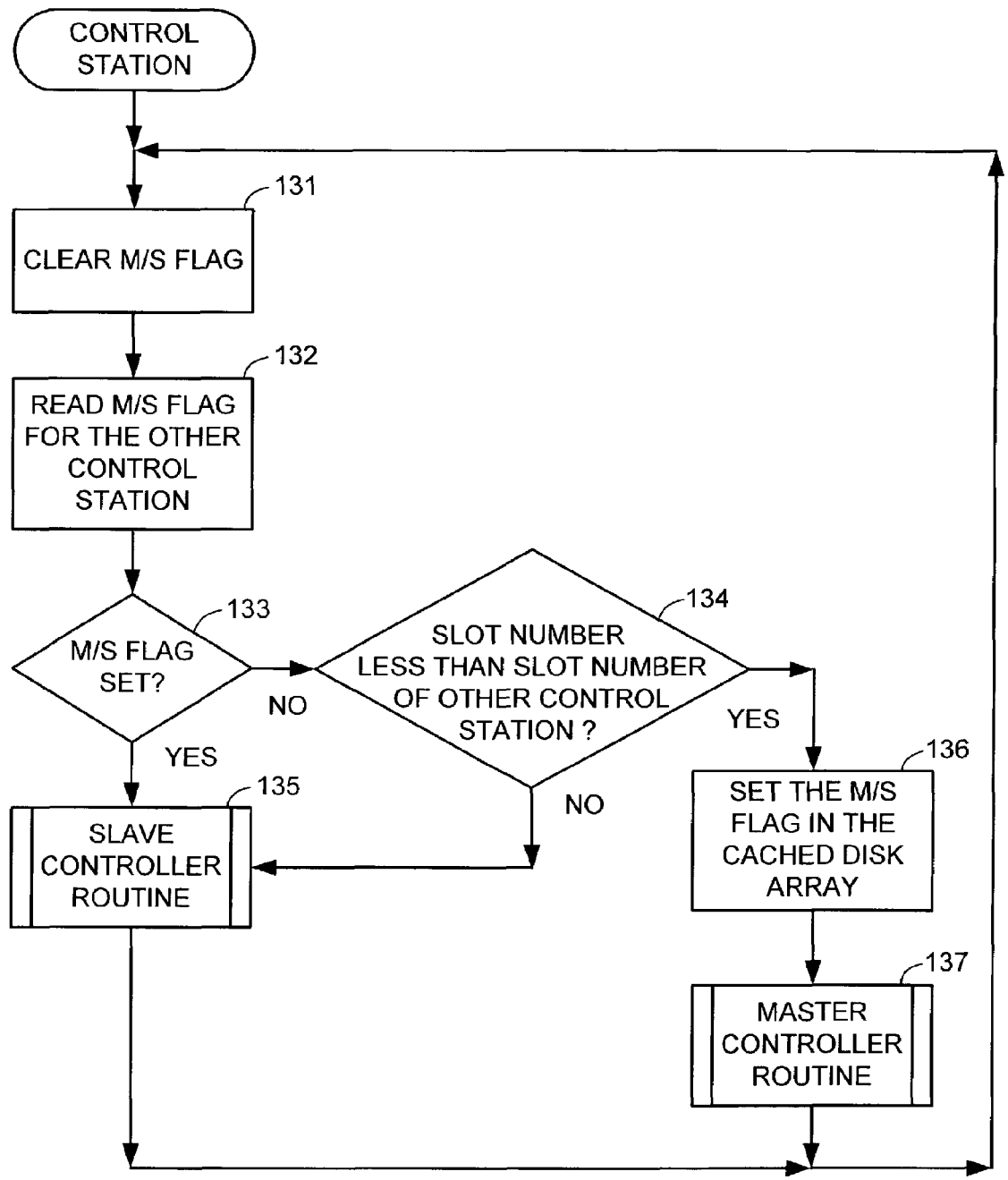
FIG. 9 shows a flowchart of a control station routine for the network file server of FIG. 4.

FIG. 9 shows a high-level routine in each of the control stations. This high-level routine determines the "master" or "slave" status of each control station as reflected by a respective master/slave flag stored in the cached disk array for each control station. In a first step 131 the control station initializes its state to assume slave status by clearing its master/slave (M/S) flag. The control station then reads the M/S flag of the second control station in step 132. In the next step 133 this M/S flag is inspected to determine whether or not the control station will enter "boot time arbitration logic" 134 to determine whether execution should branch to a slave controller routine 135 or a master controller routine 137. For example, if the M/S flag is cleared, then the control station will compare its slot number to the slot number of the other control station. If the control station's slot number is numerically less than the slot number of the other control station, then its execution will branch to set its M/S flag in the cached disk array in step 136 and then in step 137 it will invoke the master controller routine; otherwise, its execution will branch to the slave controller routine in step 135. If the M/S flag of the other control station is found to be set, the control station's execution will always branch to the slave controller routine 135. In this fashion, initially one of the control stations assumes master status, and the other control station assumes slave status, as indicated by respective M/S flags for each of the control stations. After steps 135 and 137, execution loops back to step 131.

Figure 10:
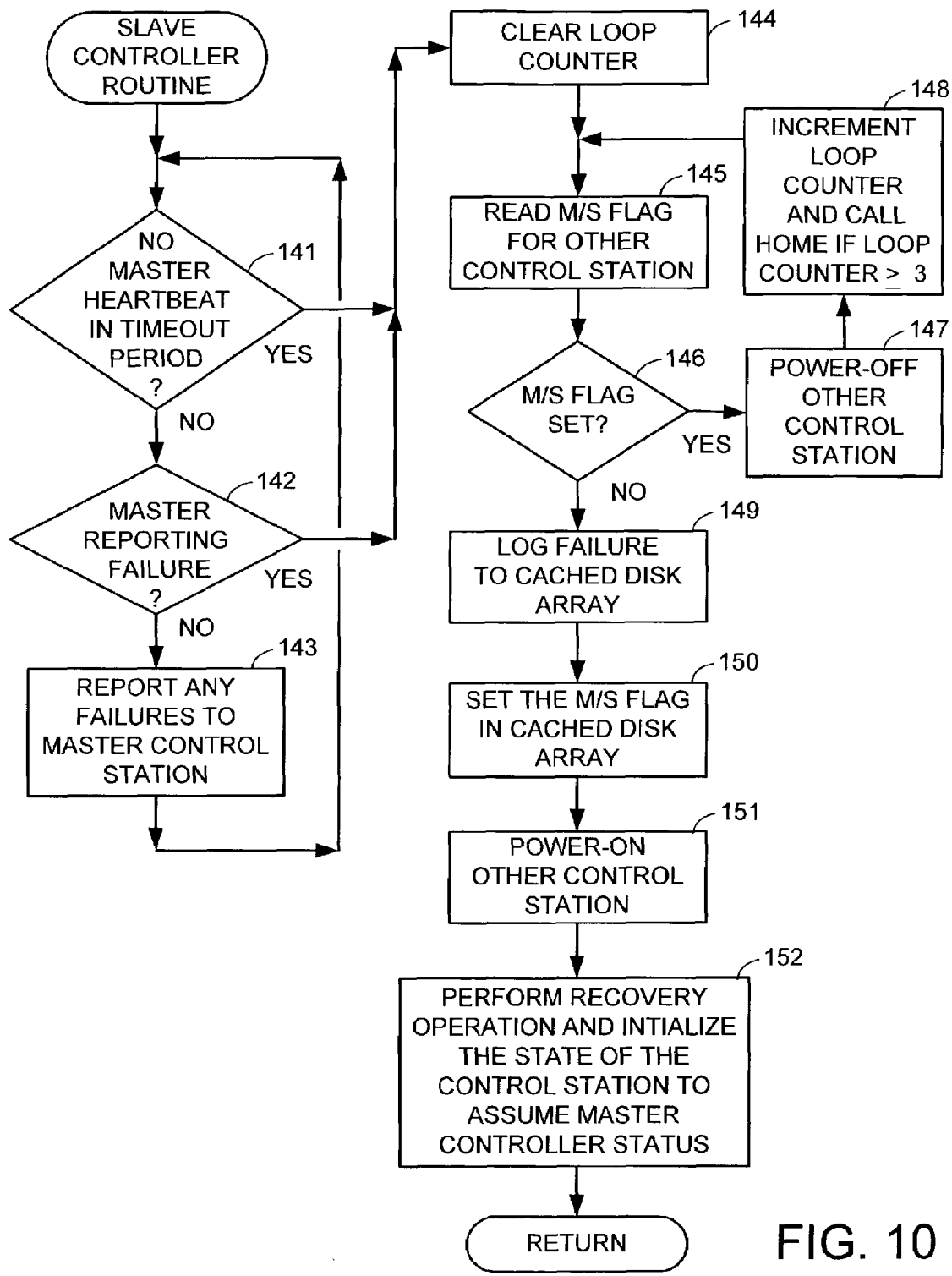
FIG. 10 shows a flowchart of a slave controller routine in the network file server of FIG. 4.

Turning now to FIG. 10, there is shown the slave controller routine called in step 135 of FIG. 9. In the first step 141 of FIG. 10, the control station checks whether it has failed to receive a master heartbeat within the configured timeout period. Step 141, for example, is programmed using software interrupt routines. Initially a software timer is set to the value of the configured timeout period, for example, four seconds. The software timer is periodically decremented by a scheduler timer routine, and reset to the value of the configured timeout period upon receipt of a master heartbeat. The scheduler timer routine executes a software interrupt when the software timer has a zero value, causing execution to branch from step 141 to step 144.

In step 142, the slave control station checks whether the master controller, in its heartbeat, has reported a failure sufficiently severe that the slave control station should assume master status. If so, execution branches from step 142 to step 144. Otherwise execution branches to 143 and the slave controller informs that master control station, through an alternate messaging protocol over the internal Ethernet, of any failures severe enough such that the master control station should "call home" and report them to a customer service center.

In step 144, the slave control station clears a loop counter variable that may be used later in step 148 in order to count the number of times that execution may pass through a loop including steps 145, 146, 147, and 148. Then in step 145, the slave control station reads the state of the M/S flag of the other (i.e., the master) control station. In step 146 this flag is used as a branch condition, and if it is set then execution branches to step 147 where the slave controller shuts off power to the master control station. This should force the M/S flag of the master controller to become cleared. Execution continues from step 147 to step 148. In step 148, the loop counter is incremented by a value of one and compared to a value of three in order to determine whether or not to "call home."

If the loop counter is found to have a value of at least three, then the slave control station "calls home" and reports that the master controller is failing to power off. Under such a condition, there is a hardware failure in circuitry between the slave control station and the master control station, and this circuitry should be repaired. For example, an output line from each control station is an enable input to a power supply control for the other controller, and an output line from each control station provides the control station's M/S flag state to an input line of the other control station. If power to a control station is shut off, then these two output lines of the control station assume an inactive state since power to the control station's output line drivers is shut off. Moreover, when power to a control station is turned on, each of these two output lines of the control station remain in the inactive state until the output state is changed by execution of an instruction in the control station's program. For example, the output registers of the control station have a reset input active low that is initially held in the active low state by a power-on reset signal.

In the preferred implementation, there is an interconnect circuit board in each control station for controlling power to the control station. The interconnect circuit board in each control station is responsive to a power-off command and a power-on command that can be transmitted by the interconnect circuit board in the other control station. The power-off commands and the power-on commands are conveyed between the two interconnect circuit boards via a communications circuit board separate from the control stations. The communications circuit board is mounted to a backplane of the rack in which the control stations are mounted. Therefore, if the master control station is failing to power off in response to a power-off command from the slave control station, then there is a problem with one of the interconnect circuit boards, the communications circuit board, or the backplane. After step 148, execution loops back to step 145.

Once the M/S flag of the master control station is found to be cleared in step 146, execution continues from step 146 to step 149. In step 149, for diagnostic purposes, the slave control station now logs the nature of the failure into the cached disk array. Then in step 150, the slave control station sets its M/S flag in order to assume master status. Then in step 151, the slave control station turns on power to the master control station. If the master control station is operational, then it will re-boot and assume slave status. Then in step 152 the slave control station performs a recovery operation upon the controller ephemeral atomic state, and initializes its state to assume master status. The slave control station initializes its state to assume master status by fetching from the cached disk array the ephemeral atomic state that defines the context of the master controller program, such as respective program counter values last committed for master controller tasks in progress, and the values of variables used by the master controller program and last committed by the master control station. Finally, execution returns to the main routine shown in FIG. 9.

Turning now to FIG. 1, there is shown the master controller routine called in step 137 of FIG. 9. In a first step 161, the master control station checks the status of a "failover" flag that is set if this control station assumed master status because it failed to receive a heartbeat for the configured timeout period. If the flag is found in step 161 to be set, then execution branches to step 162. In step 162 the "fail-over" is logged into the cached disk array, and a "call home" is performed to report the event. In the next step 163, the master control station reads its slot number. If the master controller is unable to determine its slot number or detects an invalid number in step 164, then execution branches to step 165 in FIG. 12.

Figure 12:
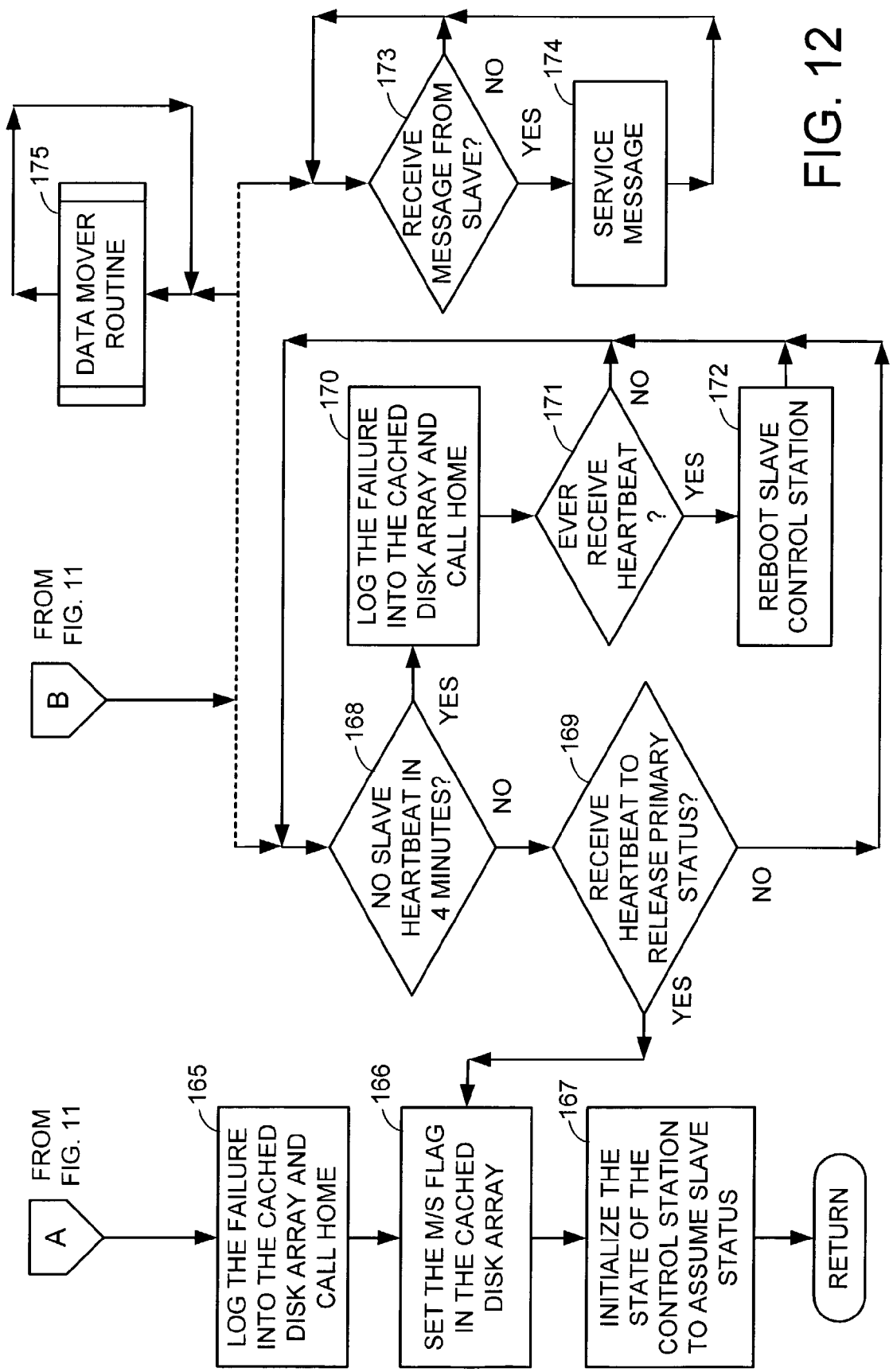
FIG. 12 is a second sheet of the flowchart begun in FIG. 11.

As shown in FIG. 12, in step 165, the failure is logged in the cached disk array, and a "call home" is performed to report the failure. Then in step 166 the control station clears its M/S flag in the cached disk array and initializes its state to drop down to slave status in step 167. Execution then returns to the main controller routine in FIG. 9.

Figure 11:
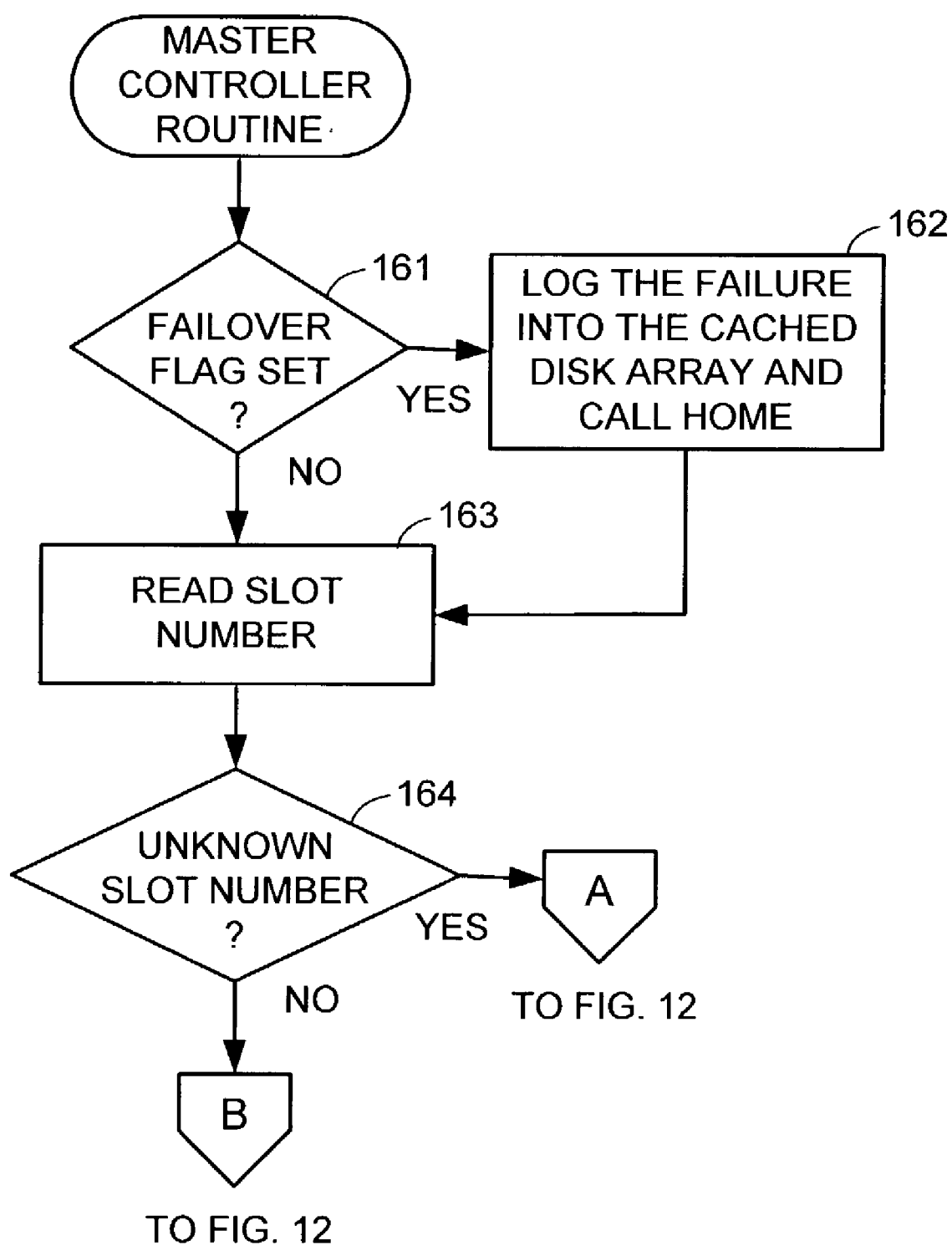
FIG. 11 is the first sheet of a flowchart of a master controller routine in the network file server of FIG. 4.

In FIG. 11, if a valid slot number is read in step 163, then execution continues from step 164 to FIG. 12 where processing is begun in three separate tasks, beginning in steps 168, 173, and 175, respectively.

The task beginning in step 168 is responsible for monitoring heartbeats coming over the internal Ethernet from the slave control station. If no slave heartbeat is received within four minutes as tested in step 168, then execution branches to step 170. The four minute period used in step 168 gives the slave controller sufficient time to boot if it were rebooted by the master controller, for example, in step 172 as described below. In step 170 the failure is logged into the cached disk array and a "call home" is performed to report the failure. Then in step 171 execution loops back to step 168 if the master had not ever received a heartbeat from the slave controller. If the master had ever received a heartbeat from the slave controller, then execution continues to step 172 where the master control station re-boots the slave control station.

If a slave heartbeat is received in four minutes as tested in step 168, then execution continues to step 169. In step 169, the content of this heartbeat message is checked to determine whether the slave control station is attempting to force the master control station to drop down to slave status. If this is true, then execution branches to step 166, where the master control station clears its M/S flag in the cached disk array and initializes its state to drop down to slave status in step 167. Execution then returns to the main controller routine in FIG. 9.

In the task beginning in step 173, the master control station listens for messages from the slave control station indicating that some event has taken place. Based on the event, the master control station will perform some action to service the message in step 174. For example, in step 143 of FIG. 10, the slave controller might inform the master control station that it was unable to determine its slot number. In such a case, the master control station would service the message in step 174 by "calling home" to report the failure.

The task begun in step 175 is responsible for performing the data mover recovery process. In step 175, a data mover management routine of FIG. 13 is invoked.

Figure 13:
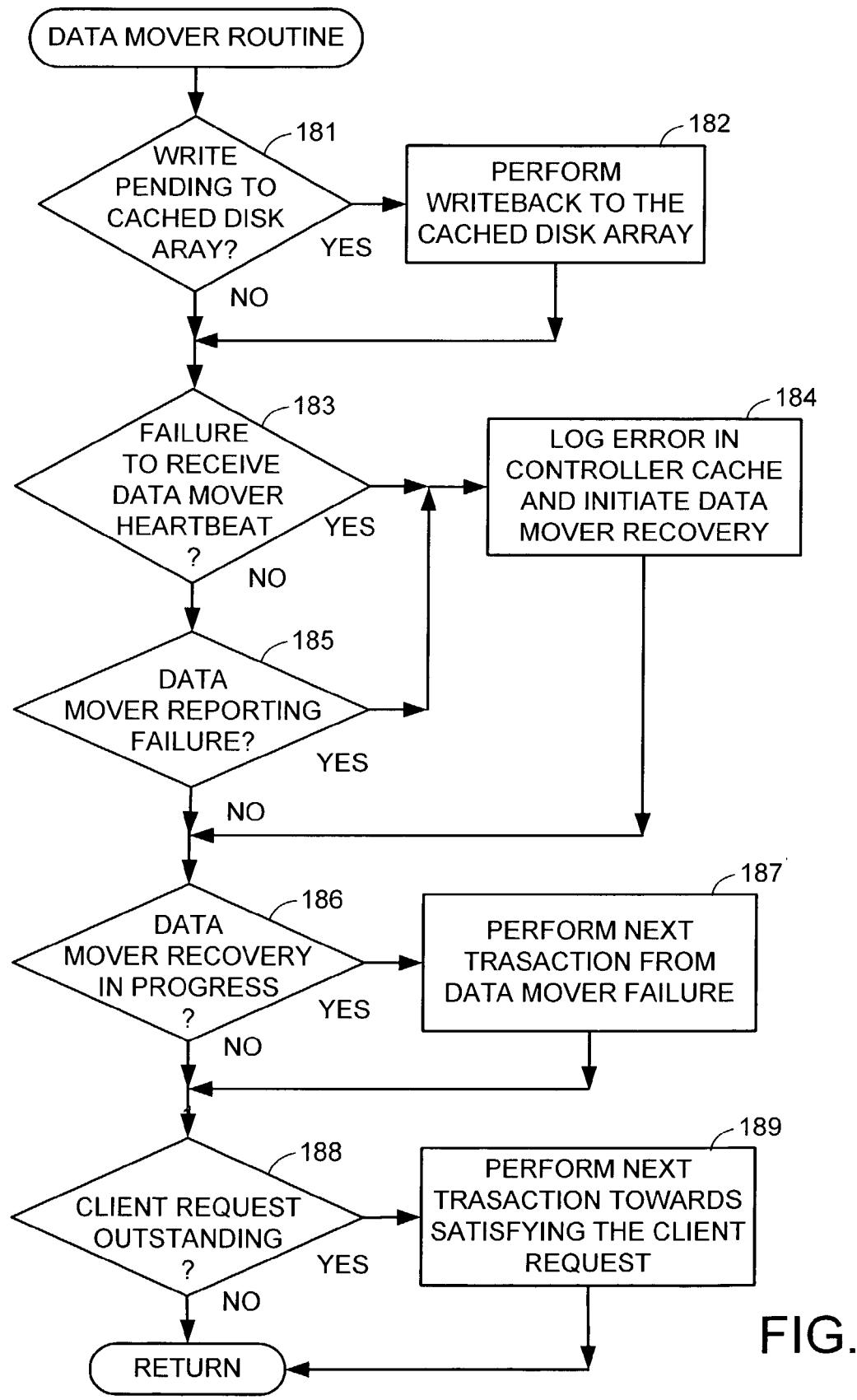
FIG. 13 is a flowchart of a data mover subroutine called in FIG. 12.

Turning to FIG. 13, in a first step 181 of the data mover management routine, the master controller checks whether a write-back operation is pending to the cached disk array. If so, execution branches to step 182 to perform the write-back operation. Step 182 includes the committing, to the control station ephemeral atomic state in the cached disk array, of any state change for transactions most recently performed in the master controller routine. After steps 181 or 182, execution proceeds to step 183. In step 183, execution branches to step 184 if the master controller fails to receive a heartbeat over the internal Ethernet from each of the data movers within a certain time-out period. For example, every second, each data mover sends the heartbeat over both channels of the internal Ethernet. The heartbeat includes, for each stream being processed by the data mover, an indication of the current position in the stream, the state of the stream (e.g., for a video stream, pause, playing, or completed), and a failure type code indicating any failure that may have occurred. Step 183 can be programmed in a fashion similar to that described above in step 141, using a respective software timer for each of the data movers. In step 184, the master controller logs the error in the master controller's cache, and initiates data mover recovery. After step 184, execution continues to step 186.

If there has not been a failure to receive the data mover heartbeat within the timeout period, then execution continues from step 183 to step 185. Step 185 checks whether the heartbeat from any of the data movers indicates a failure sufficiently serious to disrupt a stream. If so, then execution branches from step 185 to step 184 to log the error and initiate data mover recovery. Otherwise, execution continues to step 186.

In step 186, the master controller checks whether recovery for any data mover is in progress. If so, execution branches to step 187 to perform a next transaction towards recovering from a data mover failure. After step 187, execution continues to step 188. Execution also continues from step 186 to step 188 if data mover recovery is not in progress.

In step 188, the master controller checks whether there is a client request outstanding. If so, execution branches to step 189 to perform a next transaction towards satisfying the client request. After step 189, execution returns to the higher-level routine of FIG. 12. Execution also returns after step 188 if there is not a client request outstanding.

It should be understood that the master control station would also be performing certain background tasks not depicted in FIGS. 9, 11, and 12. For example, the master control station also services the server display and keyboard (87 in FIG. 4). Moreover, as described above, the master control station periodically transmits its "heartbeat" to the slave control station, and the slave control station periodically transmits its "heartbeat" to the master control station.

From the above description of FIGS. 11, 12, and 13, it should be understood that the activities of the master controller are subdivided into independent tasks, and each task is subdivided into transactions. Each transaction includes the contiguous steps of a task that can be repeated together without system disruption upon resumption of processing after a recovery operation. Tolerance of repeating steps of a transaction is desired because the controller state indicating the precise point of interruption within a transaction may be lost during a system controller failure. If repeating of the steps within a transaction is tolerated, recovery may consist of no more than starting the interrupted transaction over using the recovered state existing at the start of the transaction.

Preferably, the data movers communicate with the control stations in such a way that the data movers can tolerate receipt of at least one duplicated command from the control stations without adversely affecting data mover state, and therefore proper system operation is resumed when the slave control station assumes master control after recovery. For example, if the data mover receives a command to simply store or retrieve information, this command can be executed repeatedly without adversely affecting data mover state. In general, the commands from the master control station to each data mover are of the kind requesting the data mover to assume a definite state, or to begin an operation if that operation has not yet been performed or is not being performed, and therefore the data movers can tolerate receipt of at least one duplicated command from the control stations without adversely affecting data mover state.

A hypothetical example of a request that if duplicated might adversely affect data mover state is a single command that would cause the data mover to increment a counter in the data mover. In this hypothetical, the value of the counter would be adversely changed after recovery by a duplicate command because the counter would be incremented a second time by the duplicate command and therefore assume an incorrect value. However, it would be possible for the control station to send two different commands to the data mover to increment the counter in such a way that duplication of any single command would not adversely affect the state of the data mover. For example, the control station program could send a command "A" in a first transaction followed by a different command "B" in a second transaction, and the data mover could be programmed to increment the counter only upon receiving the command "B" immediately after the command "A". By using this technique, it is always possible for the data movers to communicate with the control stations in such a way that the data movers can tolerate receipt of at least one duplicated command from the control stations without adversely affecting data mover state.

In view of the above, there has been described a way of adapting existing software modules for use in a redundant file server having processor boards each containing more than one physical processor, wherein each physical processor provides more than one logical processor. In one preferred implementation, the redundant file server includes two dual processor boards. Each physical processor provides two logical processors. The first logical processor of the first physical processor of each board executes storage system code under the Microsoft NT™ operating system. The second logical processor of the first physical processor of each board executes control station code under the Linux operating system. The first logical processor of the second physical processor of each board executes data mover code. The second logical processor of the second physical processor of each board is kept in a stand-by mode for assuming data mover functions upon failure of the first logical processor of the second physical processor on the first or second board.

What is claimed is:

1. A redundant file server comprising at least a first processor board and a second processor board, each of the first and second processor boards being programmed to perform file server functions, the first processor board being programmed to assume the file server functions of the second processor board upon failure of the second processor board, and the second processor board being programmed to assume the file server functions of the first processor board upon failure of the first processor board, wherein each of the first and second processor boards includes at least a first physical processor and a second physical processor, wherein at least the first physical processor on each of the first and second processor boards has an on-chip cache, multiple functional units, and more than one processor register set sharing the on-chip cache and the multiple functional units to provide a first logical processor and a second logical processor;

wherein the first logical processor of the first physical processor of each of the first and second processor boards is programmed to perform storage functions including logical-to-physical mapping and access to multiple storage devices, the second logical processor of the first physical processor of each of the first and second processor boards is programmed to execute file server control functions, and the second physical processor of each of the first and second processor boards is programmed to execute data mover functions including network communication with clients and file system access; and wherein the first logical processor of the first physical processor of the first processor board is programmed to assume the storage system functions of the first logical processor of the first physical processor of the second processor board upon failure of the first logical processor of the first physical processor of the second processor board; and the first logical processor of the first physical processor of the second processor board is programmed to assume the storage system functions of the first logical processor of the first physical processor of the first processor board upon failure of the first logical processor of the first physical processor of the first processor board;

wherein the second logical processor of the first physical processor of the first processor board is programmed to assume the file server control functions of the second logical processor of the first physical processor of the second processor board upon failure of the second logical processor of the first physical processor of the second processor board; and the second logical processor of the first physical processor of the second processor board is programmed to assume the file server control functions of the second logical processor of the first physical processor of the first processor board upon failure of the second logical processor of the first physical processor of the first processor board; and wherein the second physical processor of the first processor board is programmed to assume the data mover functions of the second physical processor of the second processor board upon failure of the second physical processor of the second processor board, and the second physical processor of the second processor board is programmed to assume the data mover functions of the second physical processor of the first processor board upon failure of the second physical processor of the first processor board.

2. The redundant file server as claimed in claim 1, which includes multiple dual-port disk drives, each of the multiple dual-port disk drives having a first port linked to the first processor board for data transmission to the first processor board, and a second port linked to the second processor board for data transmission to the second processor board.

3. The redundant file server as claimed in claim 1, wherein the first and second processor boards are dual processor boards.

4. The redundant file server as claimed in claim 1, wherein the first logical processor of the first physical processor of each of the first and second processor boards executes storage system code under a first operating system, and the second logical processor of the first physical processor of each of the first and second processor boards executes file server control code under a second operating system, and the second operating system is different from the first operating system.

5. The redundant file server as claimed in claim 1, wherein the first logical processor of the first physical processor of each of the first and second processor boards executes storage system code under the Microsoft NT (trademark) operating system, and the second logical processor of the first physical processor of each of the first and second processor boards executes file server control code under the Linux operating system.

6. The redundant file server as claimed in claim 1, wherein the first processor board has random access memory for containing a first storage cache, and the second processor board has random access memory for containing a second storage cache, and the first logical processors of the first physical processors of the first and second processor boards are programmed to write new storage cache data to both the first storage cache and the second storage cache so that the new storage cache data is not lost upon failure of either the first storage cache or the second storage cache.

7. The redundant file server as claimed in claim 1, wherein the file server control functions include recovery from failure in the redundant file server, configuration of the redundant file server, and collection and reporting of loading statistics and failure information of the redundant file server.

8. The redundant file server as claimed in claim 1, wherein the file server functions include establishing a master-slave relationship between the second logical processor of the first physical processor of the first processor board and the second logical processor of the first physical processor of the second processor board.

9. A redundant file server comprising at least a first processor board and a second processor board, each of the first and second processor boards being programmed to perform file server functions, the first processor board being programmed to assume the file server functions of the second processor board upon failure of the second processor board, and the second processor board being programmed to assume the file server functions of the first processor board upon failure of the first processor board, wherein each of the first and second processor boards includes a physical processor, wherein the physical processor on each of the first and second processor boards has an on-chip cache, multiple functional units, and more than one processor register set sharing the on-chip cache and the multiple functional units to provide a first logical processor and a second logical processor;

wherein the first logical processor of the physical processor of each of the first and second processor boards is programmed to execute file server code under a first operating system, and the second logical processor of the physical processor of each of the first and second processor boards is programmed to execute file server code under a second operating system, and the second operating system is different from the first operating system.

10. The redundant file server as claimed in claim 9, wherein the first operating system is the Microsoft NT (trademark) operating system, and the second operating system is the Linux operating system.

11. The redundant file server as claimed in claim 9, wherein the first logical processor of the physical processor of each of the first and second processor boards is programmed to execute file server functions including storage system functions, and the second logical processor of the physical processor of each of the first and second processor boards is programmed to execute file server functions including file server control functions.

12. The redundant file server as claimed in claim 11, wherein the storage system functions include access to a storage system cache, logical-to-physical mapping, staging of data to the storage system cache from storage devices, and write-back from the storage system cache to the storage devices, and
wherein the file server control functions include recovery from failure in the redundant file server, configuration of the redundant file server, and collection and reporting of loading statistics and failure information of the redundant file server.

13. A redundant file server comprising at least a first processor board and a second processor board, each of the first and second processor boards being programmed to perform file server functions, the first processor board being programmed to assume the file server functions of the second processor board upon failure of the second processor board, and the second processor board being programmed to assume the file server functions of the first processor board upon failure of the first processor board,
wherein each of the first and second processor boards includes at least a first physical processor and a second physical processor,
wherein each of the first and second physical processors has an on-chip cache, multiple functional units, and more than one processor register set sharing the on-chip cache and the multiple functional units to provide a first logical processor and a second logical processor;
wherein the first logical processor of the first physical processor of each of the first and second processor boards is programmed to perform storage functions including logical-to-physical mapping and access to multiple storage devices, the second logical processor of the first physical processor of each of the first and second processor boards is programmed to execute file server control functions, the first logical processor of the second physical processor of each of the first and second processor boards is programmed to execute data mover functions including network communication with clients and file system access, and the second logical processor of the second physical processor of each of the first and second processor boards is programmed to be in a stand-by state for execution of data mover functions;
wherein the first logical processor of the first physical processor of the first processor board is programmed to assume the storage system functions of the first logical processor of the first physical processor of the second processor board upon failure of the first logical processor of the first physical processor of the second processor board; and the first logical processor of the first physical processor of the second processor board is programmed to assume the storage system functions of the first logical processor of the first physical processor of the first processor board upon failure of the first logical processor of the first physical processor of the first processor board;
wherein the second logical processor of the first physical processor of the first processor board is programmed to assume the file server control functions of the second logical processor of the first physical processor of the second processor board upon failure of the second logical processor of the first physical processor of the second processor board; and the second logical processor of the first physical processor of the second processor board is programmed to assume the file server control functions of the second logical processor of the first physical processor of the first processor board upon failure of the second logical processor of the first physical processor of the first processor board; and
wherein the second logical processor of the second physical processor of the first processor board is programmed to assume the data mover functions of the first logical processor of the second physical processor of the second processor board upon failure of the second physical processor of the second processor board, and the second logical processor of the second physical processor of the second processor board is programmed to assume the data mover functions of the first logical processor of the second physical processor of the first processor board upon failure of the second physical processor of the first processor board.

14. The redundant file server as claimed in claim 13 which includes multiple dual-port disk drives, each of the multiple dual-port disk drives having a first port linked to the first processor board for data transmission to the first processor board, and a second port linked to the second processor board for data transmission to the second processor board.

15. The redundant file server as claimed in claim 13, wherein the first and second processor boards are dual processor boards.

16. The redundant file server as claimed in claim 13, wherein the first logical processor of the first physical processor of each of the first and second processor boards executes storage system code under a first operating system, and the second logical processor of the first physical processor of each of the first and second processor boards executes file server control code under a second operating system, and the second operating system is different from the first operating system.

17. The redundant file server as claimed in claim 13, wherein the first logical processor of the first physical processor of each of the first and second processor boards executes the storage system code under the Microsoft NT (trademark) operating system, and the second logical processor of the first physical processor of each of the first and second processor boards executes the file server control code under the Linux operating system.

18. The redundant file server as claimed in claim 13, wherein the first processor board has random access memory for containing a first storage cache, and the second processor board has random access memory for containing a second storage cache, and the first logical processors of the first physical processors of the first and second processor boards are programmed to write new storage cache data to both the first storage cache and the second storage cache so that the new storage cache data is not lost upon failure of either the first storage cache or the second storage cache.

19. The redundant file server as claimed in claim 13, wherein the file server control functions include recovery from failure in the redundant file server, configuration of the redundant file server, and collection and reporting of loading statistics and failure information of the redundant file server.

20. The redundant file server as claimed in claim 13, wherein the file server control code defines a master-slave relationship between the second logical processor of the first physical processor of the first processor board and the second logical processor of the first physical processor of the second processor board.

21. The redundant file server as claimed in claim 13, wherein the second logical processor of the second physical processor of the first processor board is programmed to assume the data mover functions of the first logical processor of the second physical processor of the first processor board upon failure of the first logical processor of the second physical processor of the first processor board, and the second logical processor of the second physical processor of the second processor board is programmed to assume the data mover functions of the first logical processor of the second physical processor of the second processor board upon failure of the first logical processor of the second physical processor of the second processor board.

22. A redundant file server comprising:
a first processor board,
a second processor board, and
multiple storage devices;
wherein each of the first and second processor boards includes at least a first physical processor, a second physical processor, random access memory shared between the first physical processor and the second physical processor, a first port for responding to file access requests from clients in a data network, a second port, and a third port;
wherein the second port of the first processor board is linked to the second port of the second processor board for transfer of data between the first processor board and the second processor board;
wherein each of the first and second physical processors has an on-chip cache, multiple functional units, and more than one processor register set sharing the on-chip cache and the multiple functional units to provide a first logical processor and a second logical processor;
wherein each of the multiple storage devices has at least one port linked to the third port of the first processor board for data transmission from said each of the multiple storage devices to the third port of the first processor board, and another port linked to the third port of the second processor board for data transmission from said each of the multiple storage devices to the third port of the second processor board;
wherein the first logical processor of the first physical processor of each of the first and second processor boards is programmed to execute storage system code, the second logical processor of the first physical processor of each of the first and second processor boards is programmed to execute file server control station code, the first logical processor of the second physical processor of each of the first and second processor boards is programmed to execute data mover code, the second logical processor of the second physical processor of each of the first and second processor boards is programmed to be in a stand-by state for execution of data mover code;
wherein the first logical processor of the first physical processor of the first processor board is programmed to assume storage system functions of the first logical processor of the first physical processor of the second processor board upon failure of the first logical processor of the first physical processor of the second processor board; and the first logical processor of the first physical processor of the second processor board is programmed to assume storage system functions of the first logical processor of the first physical processor of the first processor board upon failure of the first logical processor of the first physical processor of the first processor board;
wherein the second logical processor of the first physical processor of the first processor board is programmed to assume file server control station functions of the second logical processor of the first physical processor of the second processor board upon failure of the second logical processor of the first physical processor of the second processor board; and the second logical processor of the first physical processor of the second processor board is programmed to assume file server control station functions of the second logical processor of the first physical processor of the first processor board upon failure of the second logical processor of the first physical processor of the first processor board; and
wherein the second logical processor of the second physical processor of the first processor board is programmed to assume data mover functions of the first logical processor of the second physical processor of the second processor board upon failure of the second physical processor of the second processor board, and the second logical processor of the second physical processor of the second processor board is programmed to assume data mover functions of the first logical processor of the second physical processor of the first processor board upon failure of the second physical processor of the first processor board.

23. The redundant file server as claimed in claim 22, wherein the multiple storage devices are dual-port disk drives.

24. The redundant file server as claimed in claim 22, wherein each of the first and second processor boards is a dual processor board.

25. The redundant file server as claimed in claim 22, wherein the first logical processor of the first physical processor of each of the first and second processor boards executes the storage system code under a first operating system, and the second logical processor of the first physical processor of each of the first and second processor boards executes the file server control station code under a second operating system, and the second operating system is different from the first operating system.

26. The redundant file server as claimed in claim 22, wherein the first logical processor of the first physical processor of each of the first and second processor boards executes the storage system code under the Microsoft NT (trademark) operating system, and the second logical processor of the first physical processor of each of the first and second processor boards executes the file server control station code under the Linux operating system.

27. The redundant file server as claimed in claim 22, wherein the first processor board has random access memory for containing a first storage cache, and the second processor board has random access memory for containing a second storage cache, and the first logical processor of the first physical processors of the first and second processor boards are programmed to write new storage cache data to both the first storage cache and the second storage cache so that the new storage cache data is not lost upon failure of either the first storage cache or the second storage cache.

28. The redundant file server as claimed in claim 22, wherein the storage system code defines storage system functions that are shared between the first logical processor of the first physical processor of the first processor board and the first logical processor of the first physical processor of the second processor board, and the storage system functions include access to a storage system cache, logical-to-physical mapping, staging from the multiple storage devices to the storage system cache, and write-back from the storage system cache to the multiple storage devices.

29. The redundant file server as claimed in claim 22, wherein the file server control station code defines file server control station functions including recovery from failure in the redundant file server, configuration of the redundant file server, and collection and reporting of loading statistics and failure information of the redundant file server.

30. The redundant file server as claimed in claim 22, wherein the file server control station code defines a master-slave relationship between the second logical processor of the first physical processor of the first processor board and the second logical processor of the first physical processor of the second processor board.

31. The redundant file server as claimed in claim 22, wherein the data mover code defines data mover functions including network communication with clients and file system access.

32. The redundant file server as claimed in claim 22, wherein the first processor board and the second processor board are substantially identical.

33. The redundant file server as claimed in claim 22, further comprising a third processor board and a fourth processor board linked to the second port of the first processor board and linked to the second port of the second processor board, the third processor board and the forth processor board each being programmed to perform data mover functions, the third processor board being programmed to assume the data mover functions of the fourth processor board upon failure of the fourth processor board, and the fourth processor board being programmed to assume the data mover functions of the third processor board upon failure of the third processor board.

34. The redundant file server as claimed in claim 22, wherein the second logical processor of the second physical processor of the first processor board is programmed to assume the data mover functions of the first logical processor of the second physical processor of the first processor board upon failure of the first logical processor of the second physical processor of the first processor board, and the second logical processor of the second physical processor of the second processor board is programmed to assume the data mover functions of the first logical processor of the second physical processor of the second processor board upon failure of the first logical processor of the second physical processor of the second processor board.

* * * * *